(12) United States Patent
Mine

(10) Patent No.: US 11,509,814 B2
(45) Date of Patent: Nov. 22, 2022

(54) IMAGE CAPTURING APPARATUS, METHOD FOR CONTROLLING THE SAME, AND STORAGE MEDIUM

(71) Applicant: CANON KABUSHIKI KAISHA, Tokyo (JP)

(72) Inventor: Yosuke Mine, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/160,552

(22) Filed: Jan. 28, 2021

(65) Prior Publication Data

US 2021/0152743 A1  May 20, 2021

Related U.S. Application Data

(63) Continuation of application No. PCT/JP2019/024228, filed on Jun. 19, 2019.

(30) Foreign Application Priority Data

Sep. 12, 2018 (JP) .............................. JP2018-170897

(51) Int. Cl.
*H04N 5/232* (2006.01)
*H04N 5/369* (2011.01)
*H04N 5/351* (2011.01)

(52) U.S. Cl.
CPC ....... *H04N 5/232122* (2018.08); *H04N 5/351* (2013.01); *H04N 5/36961* (2018.08)

(58) Field of Classification Search
CPC ......... H04N 5/232122; H04N 5/36961; H04N 5/351; H04N 5/225; H04N 5/232; H04N 5/341; G03B 13/36; G02B 7/34
See application file for complete search history.

(56) References Cited

U.S. PATENT DOCUMENTS

| 9,531,946 | B2 | 12/2016 | Okubo |
| 9,781,331 | B2 * | 10/2017 | Mine ................. H04N 5/23219 |
| 9,998,679 | B2 | 6/2018 | Nakata |
| 2011/0052173 | A1 * | 3/2011 | Yoshida ................... G03B 7/00 396/213 |

(Continued)

FOREIGN PATENT DOCUMENTS

| JP | 2015-041890 A | 3/2015 |
| JP | 2016-072695 A | 5/2016 |

(Continued)

OTHER PUBLICATIONS

International Search Report dated Sep. 17, 2019, in International Patent Application No. PCT/JP2019/024228.

*Primary Examiner* — Gevell V Selby
(74) *Attorney, Agent, or Firm* — Venable LLP

(57) ABSTRACT

An image capturing apparatus includes an area sensor on which photoelectric conversion elements are arranged two-dimensionally, and that includes a plurality of regions, a reading unit for reading, from the area sensor, signals photoelectrically converted by the photoelectric conversion elements, a focus detection unit for performing focus detection using the signals read by the reading unit, and a control unit for performing control as to from which region of the plurality of regions the reading unit preferentially reads the signals of the photoelectric conversion elements.

16 Claims, 27 Drawing Sheets

(56) References Cited

U.S. PATENT DOCUMENTS

| | | | |
|---|---|---|---|
| 2012/0237195 A1* | 9/2012 | Masuyama | G03B 7/08 |
| | | | 396/233 |
| 2016/0094778 A1* | 3/2016 | Okubo | H04N 5/232122 |
| | | | 348/349 |
| 2018/0020150 A1 | 1/2018 | Tozawa | |
| 2018/0063410 A1* | 3/2018 | Izumi | H04N 9/04557 |
| 2018/0220058 A1 | 8/2018 | Takahashi | |
| 2019/0141254 A1* | 5/2019 | Kawarada | H04N 5/23219 |

FOREIGN PATENT DOCUMENTS

| | | |
|---|---|---|
| JP | 2018-010213 A | 1/2018 |
| JP | 2018-125730 A | 8/2018 |

* cited by examiner

FIG. 9

| | | AF OPTIONAL SELECTION: CENTER | AF OPTIONAL SELECTION: RIGHT | AF OPTIONAL SELECTION: LEFT |
|---|---|---|---|---|
| FIRST TIME | | CV,CHA,CHB | RV,RHA,RHB | LV,LHA,LHB |
| SECOND ROUNDS ONWARDS | PREVIOUS MAIN AREA: VERTICAL EDGE DETECTION AREA | CHA,CHB,CV | RHA,RHB,RV | LHA,LHB,LV |
| | OTHERS | CV,CHA,CHB | RV,RHA,RHB | LV,LHA,LHB |

F I G. 12

| | | AF AUTOMATIC SELECTION |
|---|---|---|
| FIRST TIME | | CV,LV,RV,CHA,CHB,LHA,LHB,RHA,RHB |
| SECOND ROUNDS ONWARDS | PREVIOUS MAIN AREA : CV (LOCATED TO RIGHT) | CV,CHA,CHB,RV,RHA,RHB,LV,LHA,LHB |
| | PREVIOUS MAIN AREA : CV (LOCATED TO LEFT) | CV,CHA,CHB,LV,LHA,LHB,RV,RHA,RHB |
| | PREVIOUS MAIN AREA : CHA,CHB (LOCATED TO RIGHT) | CHA,CHB,CV,RHA,RHB,RV,LHA,LHB,LV |
| | PREVIOUS MAIN AREA : CHA,CHB (LOCATED TO LEFT) | CHA,CHB,CV,LHA,LHB,LV,RHA,RHB,RV |
| | PREVIOUS MAIN AREA : RV | RV,RHA,RHB,CV,CHA,CHB,LV,LHA,LHB |
| | PREVIOUS MAIN AREA : RHA,RHB | RHA,RHB,RV,CHA,CHB,CV,LHA,LHB,LV |
| | PREVIOUS MAIN AREA : LV | LV,LHA,LHB,CV,CHA,CHB,RV,RHA,RHB |
| | PREVIOUS MAIN AREA : LHA,LHB | LHA,LHB,LV,CHA,CHB,CV,RHA,RHB,RV |

READING DIRECTION

IMAGE CAPTURING APPARATUS, METHOD FOR CONTROLLING THE SAME, AND STORAGE MEDIUM

CROSS-REFERENCE TO RELATED APPLICATIONS

This application is a Continuation of International Patent Application No. PCT/JP2019/024228, filed Jun. 19, 2019, which claims the benefit of Japanese Patent Application No. 2018-170897, filed Sep. 12, 2018, both of which are hereby incorporated by reference herein in their entirety.

BACKGROUND OF THE INVENTION

Field of the Invention

The present invention relates to a focus detection technique of an image capturing apparatus.

Background Art

Conventionally, as a focus detection method of an image capturing apparatus, a focus detection method of a pupil division phase difference type is known in which focus detection pixels are arranged on an image sensor.

In such a field of focus detection technology, in order to reduce the processing time of focus detection, PTL 1 discloses a method in which signals of horizontally arranged focus detection pixels for which the reading-target row direction and the correlation direction match each other are first read.

CITATION LIST

Patent Literature

PTL1: Japanese Patent Laid-Open No. 2016-72695

However, the conventional technology disclosed in PTL 1 has the problem that it is not applicable to vertically arranged phase difference detection pixels for which the reading-target row direction and the correlation direction do not match each other.

The present invention was made in view of the aforementioned problem, and it is an object thereof to provide an image capturing apparatus that can reduce the processing time of focus detection.

SUMMARY OF THE INVENTION

An image capturing apparatus according to the present invention comprises: an area sensor on which photoelectric conversion elements are arranged two-dimensionally, and that includes a plurality of regions; and at least one processor or circuit configured to function as: a reading unit configured to read, from the area sensor, signals photoelectrically converted by the photoelectric conversion elements; a focus detection unit configured to perform focus detection using the signals read by the reading unit; and a control unit configured to perform control as to from which region of the plurality of regions the reading unit preferentially reads the signals of the photoelectric conversion elements.

Further features of the present invention will become apparent from the following description of exemplary embodiments with reference to the attached drawings.

BRIEF DESCRIPTION OF THE DRAWINGS

FIG. 9 is a diagram illustrating reading orders of the focus detection sensor during AF optional selection according to the first embodiment.

FIG. 12 is a diagram illustrating reading orders of the focus detection sensor during AF automatic selection according to the first embodiment.

DESCRIPTION OF THE EMBODIMENTS

Hereinafter, embodiments of the present invention will be described in detail with reference to the attached drawings.

First Embodiment

Figure 1:
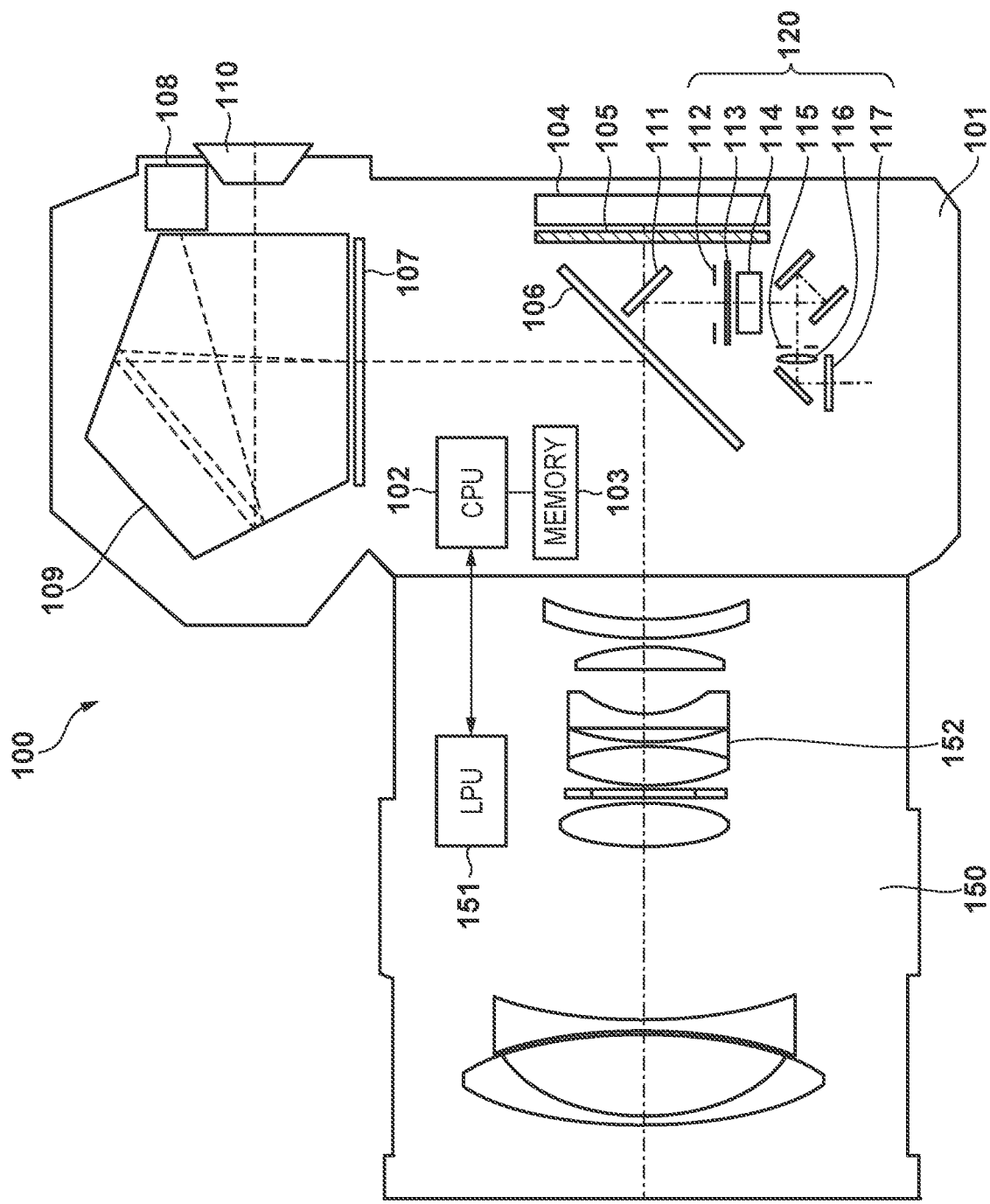
FIG. 1 is a side view illustrating a digital camera that is a first embodiment of an image capturing apparatus according to the present invention.

FIG. 1 is a side view of a digital camera that is a first embodiment of an image capturing apparatus of the present invention.

In FIG. 1, a digital camera 100 includes a camera main body 101 and a lens 150. Note that in FIG. 1, for ease of description, the internal configuration is shown in a transparent view. The camera main body 101 includes a CPU 102, a memory 103, an image sensor 104, a shutter 105, a half mirror 106, a focusing screen 107, a photometric sensor 108, a pentaprism 109, an optical finder 110, and a sub mirror 111. The camera main body 101 further includes a focus detection unit 120 that is provided with a field mask 112, an infrared cut filter 113, a field lens 114, a diaphragm 115, a secondary imaging lens 116, and a focus detection sensor 117. The lens 150 includes an LPU 151 and a lens group 152.

The CPU 102 is constituted by a micro-computer, and performs various types of control in the camera main body 101. The memory 103 is a memory such as a RAM or a ROM that is connected to the CPU 102, and stores programs and data that are executed by the CPU 102. The image sensor 104 is constituted by a CCD, a CMOS sensor, or the like that includes an infrared cut filter, a lowpass filter, or the like, and is configured such that light incident thereon from the lens 150 is formed as a subject image. The shutter 105 is driven so as to be opened and closed, and when the digital camera does not perform image capturing, the shutter 105 is closed to shield the image sensor 104, and when the digital camera performs image capturing, the shutter 105 is opened to expose the image sensor 104. The half mirror 106 reflects a portion of light incident from the lens 150 when the digital camera does not perform image capturing, so that an image is formed on the light focusing screen 107. The photometric sensor 108 includes an image sensor such as a CCD or a CMOS sensor, and performs subject recognition processing such as photometric calculation, face detection calculation, tracking calculation, and light source detection. The pentaprism 109 reflects light passed through the focusing screen 107 toward the photometric sensor 108 and the optical finder 110.

Also, the half mirror 106 is transmissive for portion of light incident from the lens 150. The transmitted light is deflected downward by the rear sub mirror 111, passes through the field mask 112, the infrared cut filter 113, the field lens 114, the diaphragm 115, and the secondary imaging lens 116, and forms an image on the focus detection sensor 117 on which photoelectric conversion elements are arranged two-dimensionally. The focus detection unit 120 detects the focus state of the lens 150 based on an image signal obtained by photoelectrically converting the image.

The LPU 151 is constituted by a micro-computer, and controls the lens group 152 of the lens 150 to move. For example, upon receiving a defocus amount, which indicates an amount of shift in focus, from the CPU 102, the LPU 151 causes the lens group 152 to move to the position (hereinafter, referred to as "focusing position") at which they come into focus, based on the defocus amount.

Figure 2:
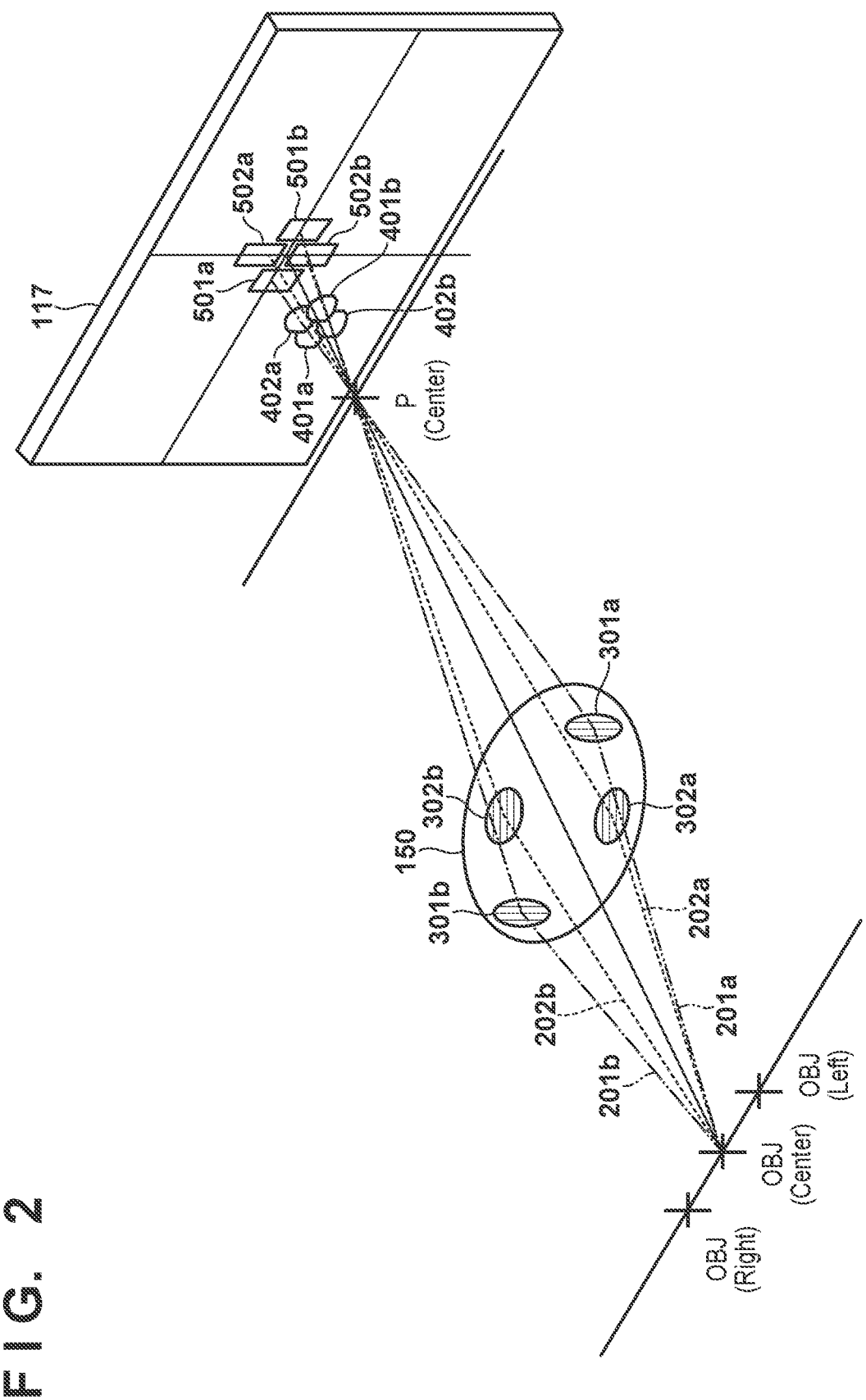
FIG. 2 is a perspective view schematically illustrating a configuration of a focus detection optical system.
Figure 3:
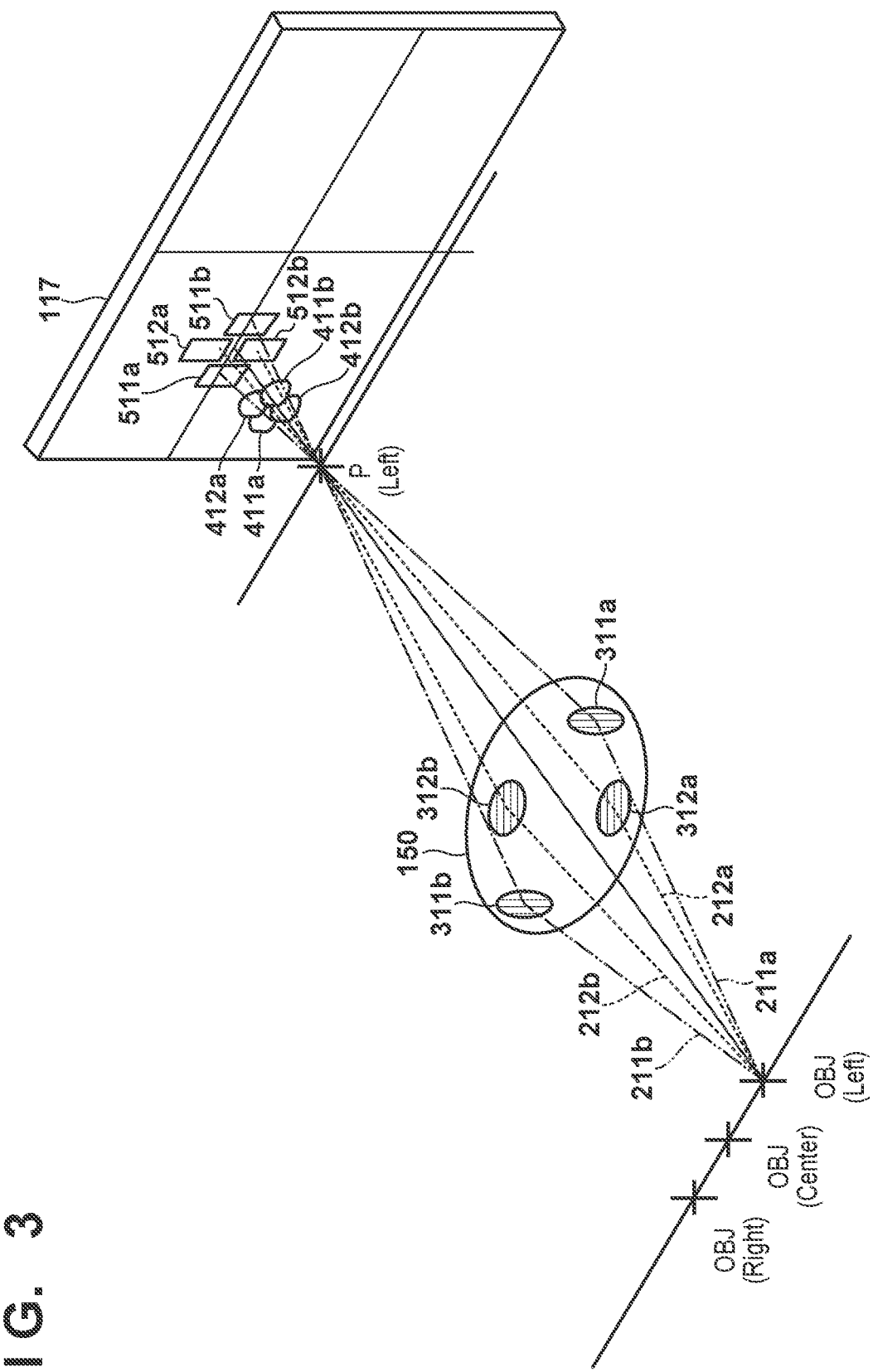
FIG. 3 is a perspective view schematically illustrating a configuration of the focus detection optical system.
Figure 4:
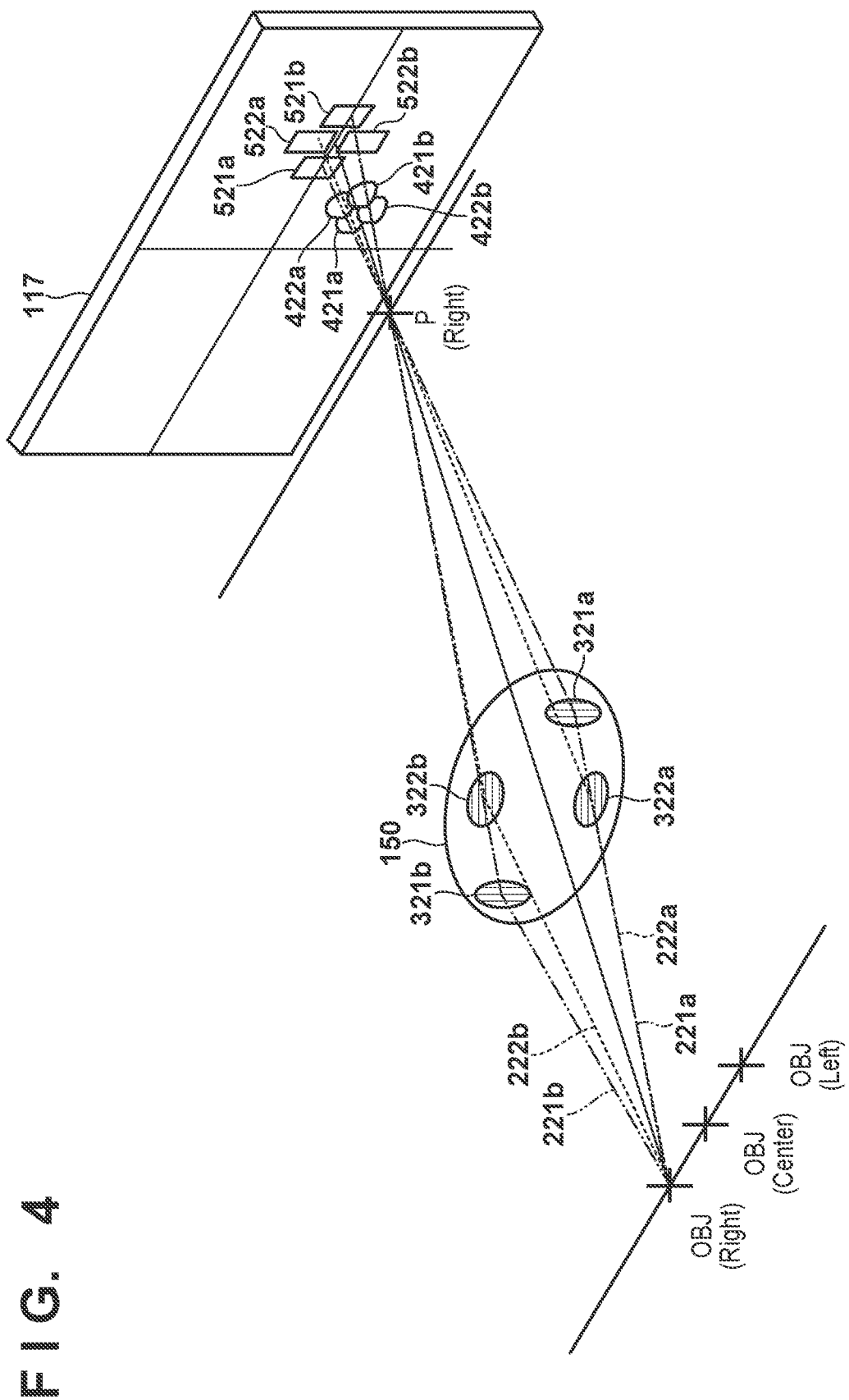
FIG. 4 is a perspective view schematically illustrating a configuration of the focus detection optical system.

FIGS. 2 to 4 are diagrams conceptually illustrating the principle of focus detection.

In FIG. 2, light fluxes 201a and 201b from a subject OBJ (Center) located at the center pass through pupils 301a and 301b of the lens 150, and form an image on a focusing plane P(Center) (primary imaging plane) in the vicinity of the field mask 112. The light fluxes 201a and 201b are divided at secondary imaging lenses 401a and 401b, and again form images in image formation areas 501a and 501b of the focus detection sensor 117, and the two left and right subject images are subjected to correlation calculation, thereby obtaining the defocus amount.

Similarly, light fluxes 202a and 202b pass through pupils 302a and 302b of the lens 150, and form an image on the focusing plane P (Center) (primary imaging plane) in the vicinity of the field mask 112. The light fluxes 202a and 202b are divided at secondary imaging lenses 402a and 402b, and again form images in image formation areas 502a and 502b of the focus detection sensor 117, and the two upper and lower subject images are subjected to correlation calculation, thereby obtaining the defocus amount.

FIG. 3 shows a conceptual diagram when a subject OBJ (Left) on the left side is detected, and FIG. 4 shows a subject OBJ (Right) on the right side is detected. In the manner similar to that of FIG. 2, an image is formed and then images are respectively formed again in image formation areas 511a and 511b, in image formation areas 521a and 521b, in image formation areas 512a and 512b, and in image formation areas 522a and 522b.

Figure 5:
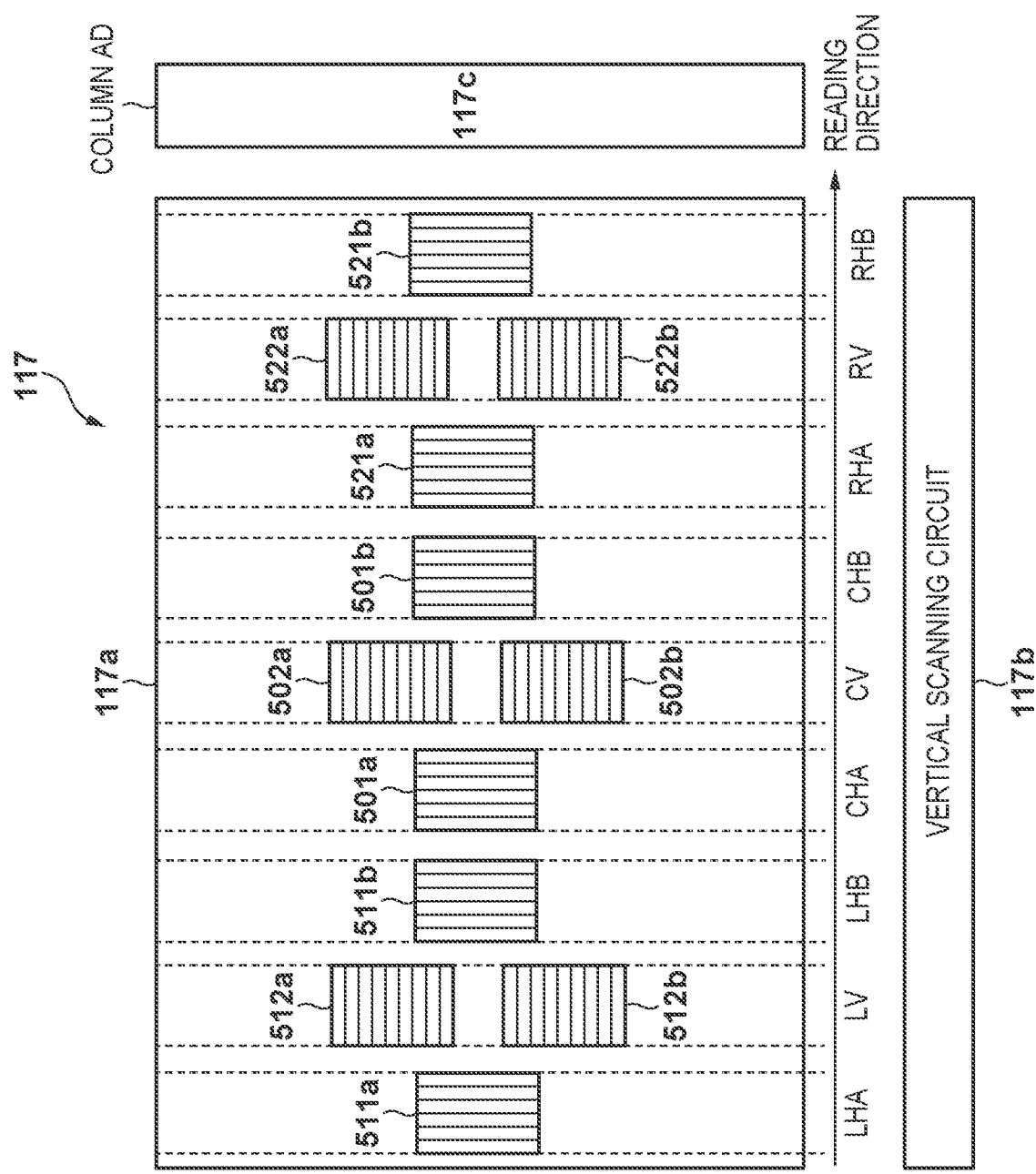
FIG. 5 is a diagram illustrating image formation areas of a focus detection sensor.

FIG. 5 is a diagram showing an overview of a correspondence relationship between the focus detection sensor 117 and the image formation areas. The focus detection sensor 117 includes a pixel portion 117a, a vertical scanning circuit 117b that selects pixel columns arranged in the pixel portion 117a (pixel columns vertically arranged in the drawing) sequentially in a left-right direction, and a column AD converter 117c that performs AD conversion of signals read from vertical pixel columns. That is to say, in the present embodiment, signals are read for each vertical column in the drawing. The vertical direction (short-side direction of the focus detection sensor 117) is referred to as "reading-target column direction" in the present embodiment. Signals of pixels of each column are transferred in a horizontal direction via a signal line and are input to the column AD converter 117c. This horizontal direction (long-side direction of the focus detection sensor 117) is referred to as "reading direction" in the present embodiment. Note that the focus detection sensor 117 can suitably change the order of reading-target columns.

In the present embodiment, it is possible to suitably change the order of reading of nine areas shown in FIG. 5, namely, LHA, LV, LHB, CHA, CV, CHB, RHA, RV, and RHB.

In the image formation areas 502a and 502b in FIG. 5, the correlation direction (pupil division direction of the lens 150) is the vertical direction and horizontal line detection is possible. Because the reading-target column direction and the correlation direction match each other, a defocus amount can be calculated using the same column of the area CV. In other words, it is possible to start processing for calculating the defocus amount at the same time as reading.

The same applies to the image formation areas 512a and 512b, and the image formation areas 522a and 522b.

In the image formation areas 501a and 501b in FIG. 5, the correlation direction is the horizontal direction and vertical line detection is possible. Because the reading-target column direction and the correlation direction do not match each other, all of signals of the two areas CHA and CHB are read, and then processing for calculating the defocus amount is performed. In other words, it is not possible to start processing for calculating the defocus amount at the same time as reading.

The same applies to the image formation areas 511a and 511b, and the image formation areas 521a and 521b.

Figure 6:
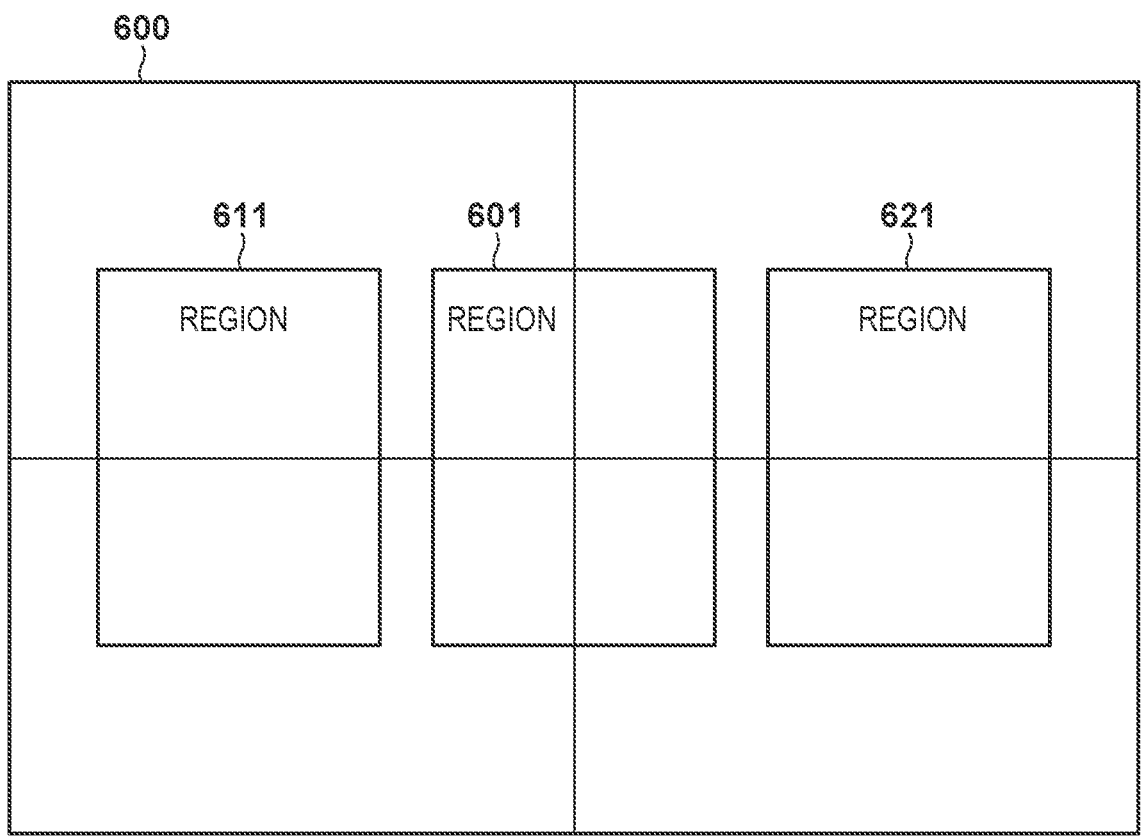
FIG. 6 is a diagram illustrating positions of image formation areas on a finder screen.

FIG. 6 is a diagram showing a relationship between a finder screen and AF regions.

An AF region 601, an AF region 611, and an AF region 621 are arranged on a finder screen 600. The AF region 601 is an AF region constituted by the image formation areas 501a, 501b, 502a, and 502b. The AF region 611 is an AF region constituted by the image formation areas 511a, 511b, 512a, and 512b. The AF region 621 is an AF region constituted by the image formation areas 521a, 521b, 522a, and 522b.

Figure 7:
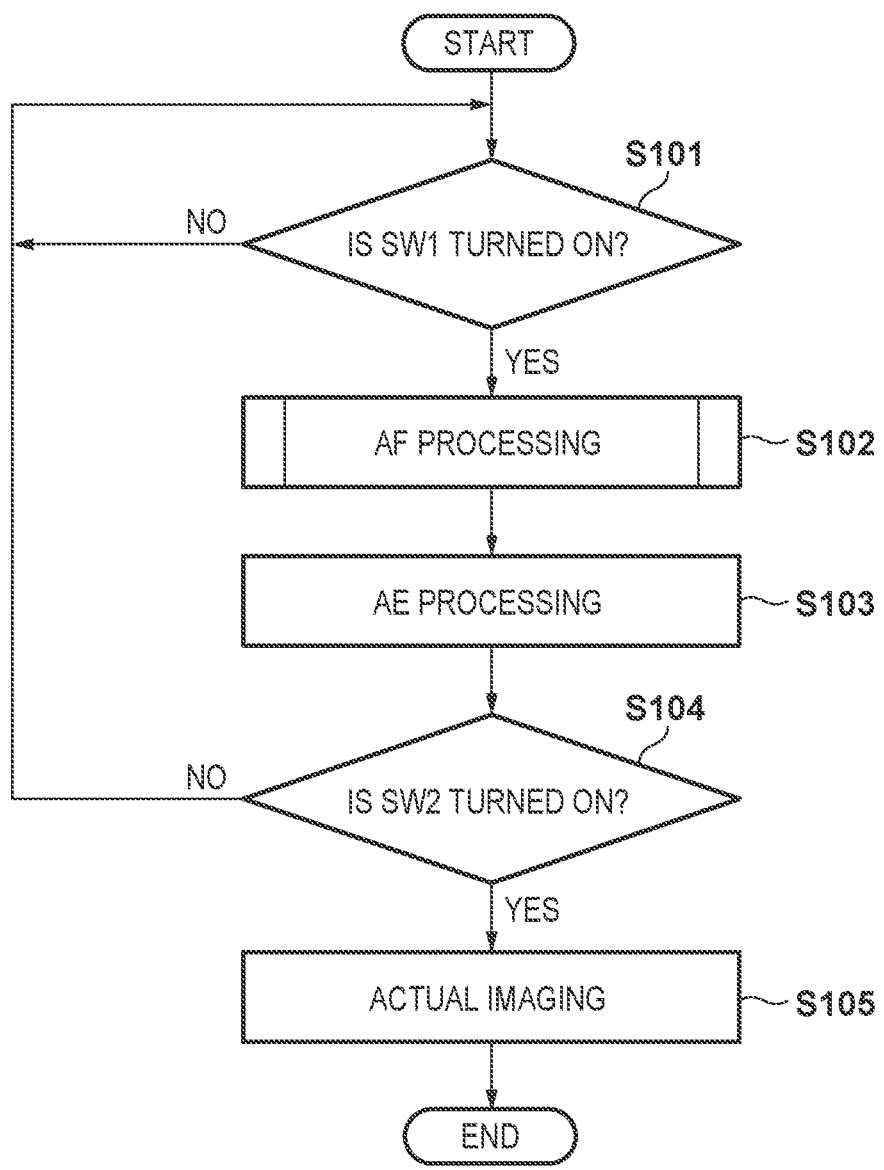
FIG. 7 is a flowchart illustrating an image capturing operation of the digital camera of the first embodiment.

FIG. 7 is a flowchart illustrating a procedure of image capturing control processing executed by the digital camera 100. The processing shown in FIG. 7 is executed by the CPU 102 executing a program stored in the memory 103, and is premised on a state in which the camera 100 is activated.

First, in step S101, the CPU 102 determines whether or not a switch SW1 is turned on, the switch SW1 instructing imaging and being turned on by a not-shown shutter switch being pressed halfway. If the switch SW1 is turned on, the procedure moves to step S102, and if the switch SW1 is not turned on, the procedure remains as is.

In step S102, the CPU 102 controls the focus detection sensor 117 to perform phase difference-type AF (automatic focus) processing, and transmits the calculated defocus amount to the LPU 151. The LPU 151 causes the lens group 152 to move to the focusing position based on the received defocus amount. Note that the AF processing will be described in detail later with reference to the flowchart of FIG. 8.

In step S103, the CPU 102 controls the photometric sensor 108 to perform AE processing. With this, a photometric value that contains luminance information of the subject in ambient light (hereinafter, referred to as "photometric value of ambient light") is obtained. Also, an exposure control value such as diaphragm value and ISO sensitivity at the time of imaging is obtained based on the photometric value of ambient light.

In step S104, the CPU 102 determines whether or not a switch SW2 is turned on, the switch SW2 being turned on by the above-described shutter switch being pressed fully. If the switch SW2 is turned on, the procedure moves to step S105, and if the switch SW2 is not turned on, the procedure remains as is.

In step S105, the CPU 102 performs actual imaging, and ends the processing of the present flowchart.

Figure 8:
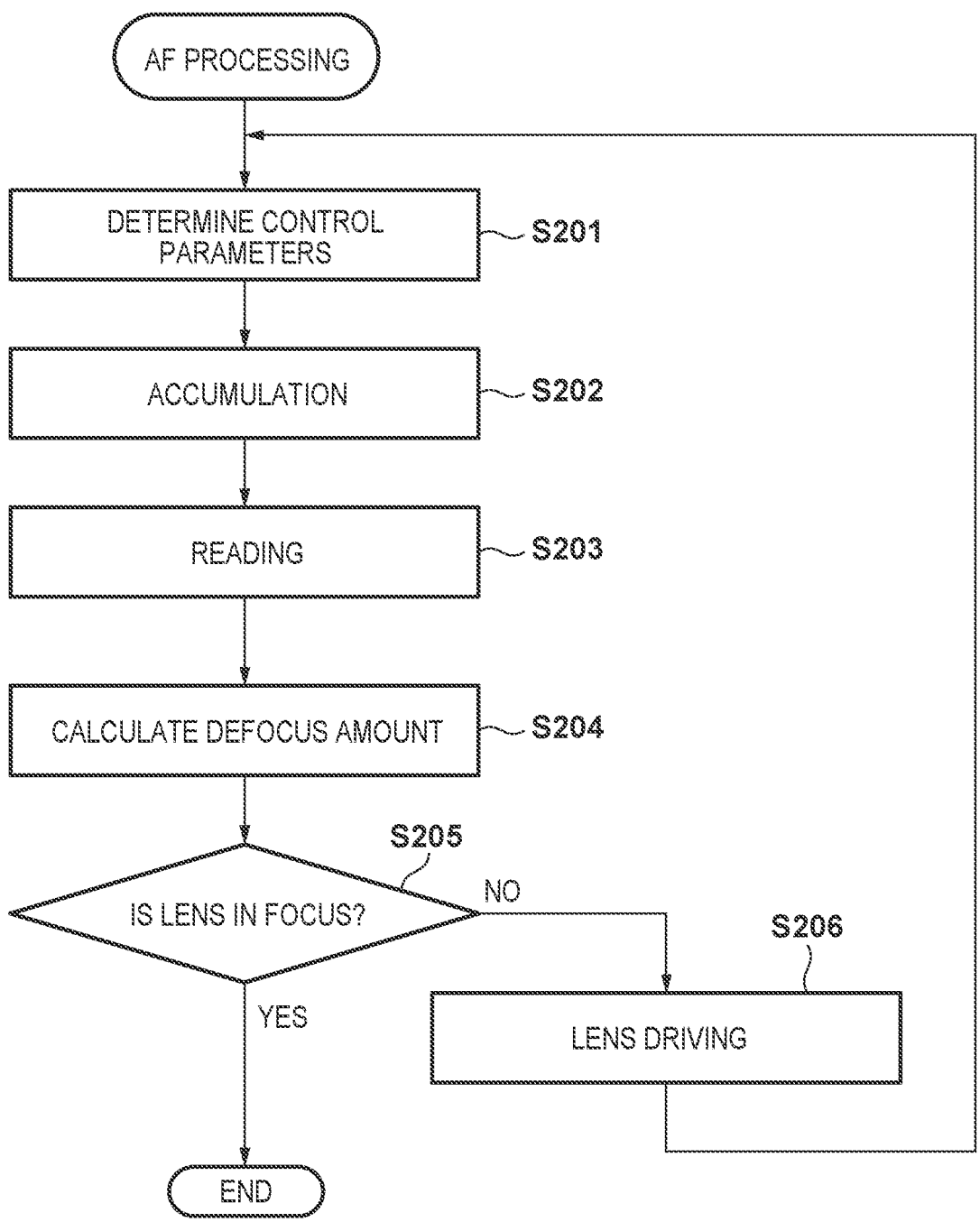
FIG. 8 is a flowchart illustrating AF processing according to the first embodiment.

FIG. 8 is a flowchart illustrating a procedure of the AF processing in step S102 in FIG. 7.

In step S201, the CPU 102 determines the exposure amount and the order of reading-target columns, which are control parameters. The first exposure amount is set to any value. From the second round onwards, the exposure amount that realizes correct exposure is determined based on the previous exposure amount and luminance value. The method for determining the reading order of reading-target columns (image formation areas) will be described in detail later.

In step S202, the CPU 102 causes the focus detection sensor 117 to accumulate charge based on the control parameters determined in step S201. In step S203, the CPU 102 reads pixel signals from the focus detection sensor 117 based on the reading order of reading-target columns (reading order of the image formation areas) determined in step S201.

In step S204, the CPU 102 calculates the defocus amount based on pixel signals for each of the image formation areas read in step S203. Specifically, a pair of image signals are acquired from pixel outputs of a pair of image formation areas, and the defocus amount for each image formation area is calculated based on the phase difference between these image signals.

Here, if a user optionally selects a region on which AF is to be performed (AF optional selection), the defocus amount obtained using the image signals in the image formation areas corresponding to the selected AF region is regarded as the eventual defocus amount. Note that in the present embodiment, there are image formation areas for vertical line detection and image formation areas for horizontal line detection. The method for selecting any of these image formation areas for vertical line detection and the image formation areas for horizontal line detection is not particularly limited, but an image formation area that is considered to have a reliable defocus amount, such as an image formation area in which the correlation of the waveforms of image signals is high or the contrast of the waveforms of image signals is high, is selected as a main area. The defocus amount obtained from the main area is defined as the eventual defocus amount.

On the other hand, if the user sets automatic selection for an AF region (AF automatic selection), an AF region is selected by averaging or weighted averaging the results of the vertical line detection and the horizontal line detection of the entire screen. The defocus amount of any one of the image formation areas of the selected AF regions is selected. A method for selecting an image formation area is not particularly limited, but an image formation area that is considered to have a reliable defocus amount, such as an image formation area in which the correlation of the waveforms of image signals is high or the contrast of the waveforms of image signals is high, is weighted. An area with a high weight is selected as a main area, and the defocus amount obtained from the main area is defined as the eventual defocus amount.

In step S205, the CPU 102 determines whether or not the lens is in focus. If the lens is in focus, the AF processing is ended, and if the lens is not in focus, the procedure moves to step S206. Specifically, if the defocus amount is in a desired range, for example, ¼ Fδ (where F is a diaphragm value of the lens, and δ is a constant (20 μm)), it is determined that the lens is in focus. For example, if the lens diaphragm value F=2.0, and the defocus amount is 10 μm or smaller, it is determined that the lens is in focus, and the AF processing is ended.

If the defocus amount is larger than ¼ Fδ, the CPU 102 instructs, in step S206, the lens 150 to perform lens driving by the amount that corresponds to the defocus amount obtained in step S204. Then, the CPU 102 moves the processing back to step S201, and repeats the operations of steps S201 to S206 until it is determined that the lens is in the focus state.

The following will describe a method for determining the reading order of the areas.

In the case of AF optional selection, by changing the reading order of the areas according to the conditions shown in FIG. 9, the processing time of focus detection is reduced. The following describes an example where the central AF region (region 601 in FIG. 6) is selected through AF optional selection, but the same applies to cases where any of the right and left AF regions is selected.

Figure 10:
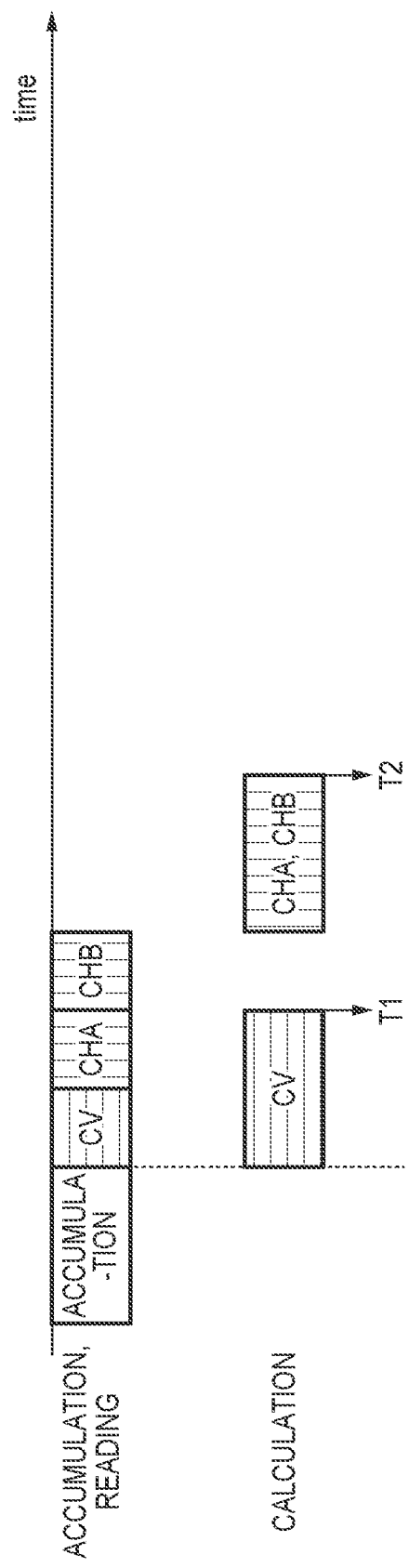
FIG. 10 is a timing chart of a reading order according to the first embodiment.

At the first time when the situation of the subject field is unclear, as shown in FIG. 10, pixel signals are read in the order from the areas CV, CHA, and CHB in FIG. 5. In this case, in the area CV, the correlation direction is the vertical direction, and the reading-target column direction and the correlation direction match each other, and thus it is possible to start the focus detection processing at the same time as the reading of the signals. In contrast, in the areas CHA and CHB, the correlation direction is the horizontal direction, and the reading-target column direction and the correlation direction do not match each other, and thus it is not possible to perform the focus detection processing unless all of the signals are read. Accordingly, in the area CV, the focus detection processing is started at the same time as the reading of the signals in the area CV, and the defocus amount for the horizontal lines is calculated at time T1. Then, the signals in the areas CHA and CHB are read, and the focus detection processing is started after the completion of the reading, and the defocus amount for the vertical lines is calculated at time T2.

By defining the above-described reading order of reading-target columns, it is possible to promptly obtain both of the results of horizontal line detection and vertical line detection. The time at which the calculation of the defocus amount ends may be set to the time T1 or T2.

Figure 11:
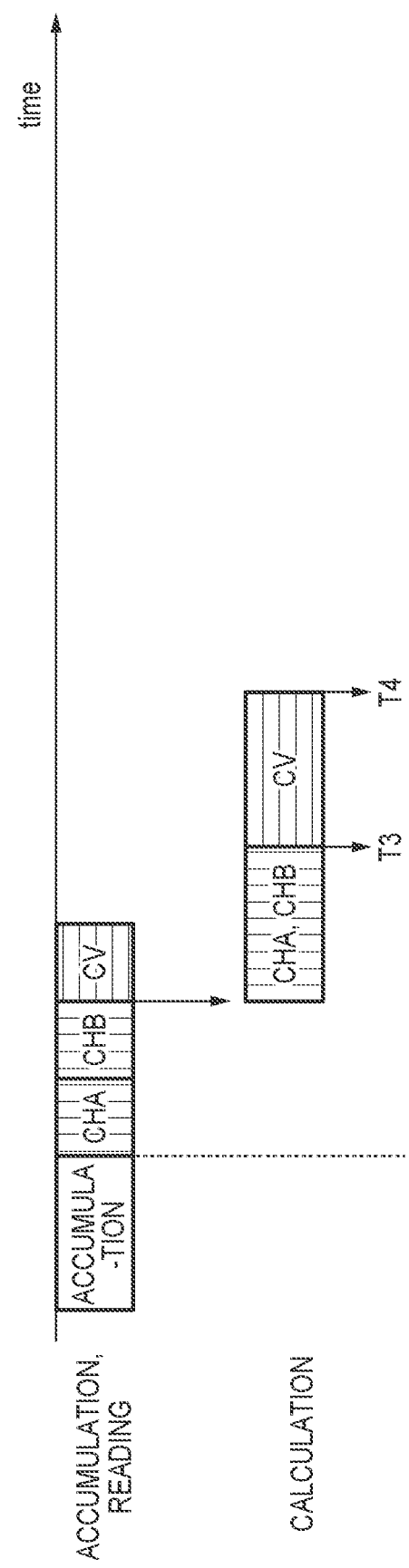
FIG. 11 is a timing chart of a reading order according to the first embodiment.

From the second AF processing onwards, if the area for vertical line detection was used as the main area in the previous AF processing, signals are read in the order from the areas CHA, CHB, and CV as shown in FIG. 11. As already described above, in the areas CHA and CHB, the reading-target column direction and the correlation direction do not match each other, and thus it is not possible to perform the focus detection processing unless all of the signals are read. Accordingly, after the reading of the signals of the areas CHA and CHB is complete, the focus detection processing is started, and the defocus amount for the vertical lines is calculated at time T3. Then, processing for the area CV is performed, and the defocus amount for the horizontal lines is calculated at time T4. As a result of the calculation of the defocus amounts being completed at the timing of time T3, it is possible to reduce the AF processing time.

By defining the above-described reading order of reading-target columns, it is possible to promptly obtain the results of vertical line detection. Note that the time T4 at which the result of the horizontal line detection is obtained is later than the time T1, but if a result of vertical line detection was used in the previous case, the likelihood that a result of vertical line detection is used also in this case is high, and thus a priority is given to the vertical line detection.

In a case other than the case where the area for which vertical line detection was previously performed, by reading the signals in the order from the areas CV, CHA, and CHB as shown in FIG. 10 also in the second AF processing onwards, it is possible to promptly obtain both of the results of horizontal line detection and vertical line detection. By setting the reading order of the areas in this way, it is possible to reduce the processing time of focus detection in the case of AF optional selection.

The following will describe the case of AF automatic selection. In this case, by switching the reading order of the areas based on the conditions shown in FIG. 12, the processing time of focus detection is reduced.

Figure 13:
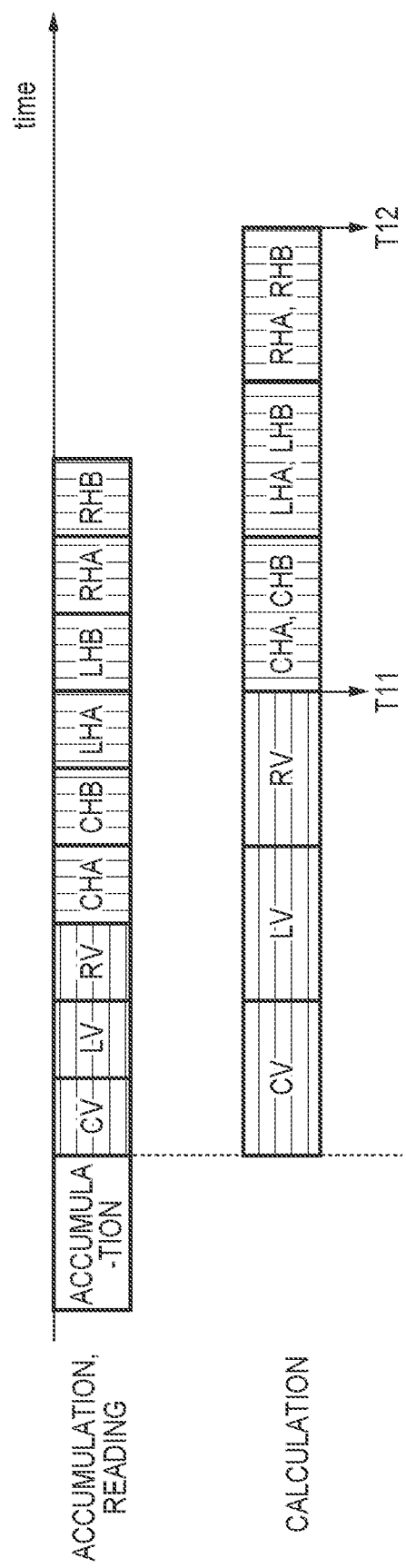
FIG. 13 is a timing chart of a reading order according to the first embodiment.

At the first time when the situation of the subject field is unclear, as shown in FIG. 13, pixel signals are read in the order from the areas CV, LV, and RV in FIG. 5. In this case, in the areas CV, LV, and RV, the correlation direction is the vertical direction, and the reading-target column direction and the correlation direction match each other, and thus it is possible to start the focus detection processing at the same time as the reading of the signals. Accordingly, in these areas, the focus detection processing is started at the same time as the reading of the signals.

Then, signals of the other areas are sequentially read, and the focus detection processing is performed. By defining the above-described reading order, the end time (T11) for calculation of the defocus amounts of all of the areas in which horizontal line detection is performed, and the end time (T12) for calculation of the defocus amounts of both of the areas for horizontal line detection and vertical line detection is reached earlier. The time at which the calculation of the defocus amount ends may be set to any of the time T11 and the time T12.

Figure 14:
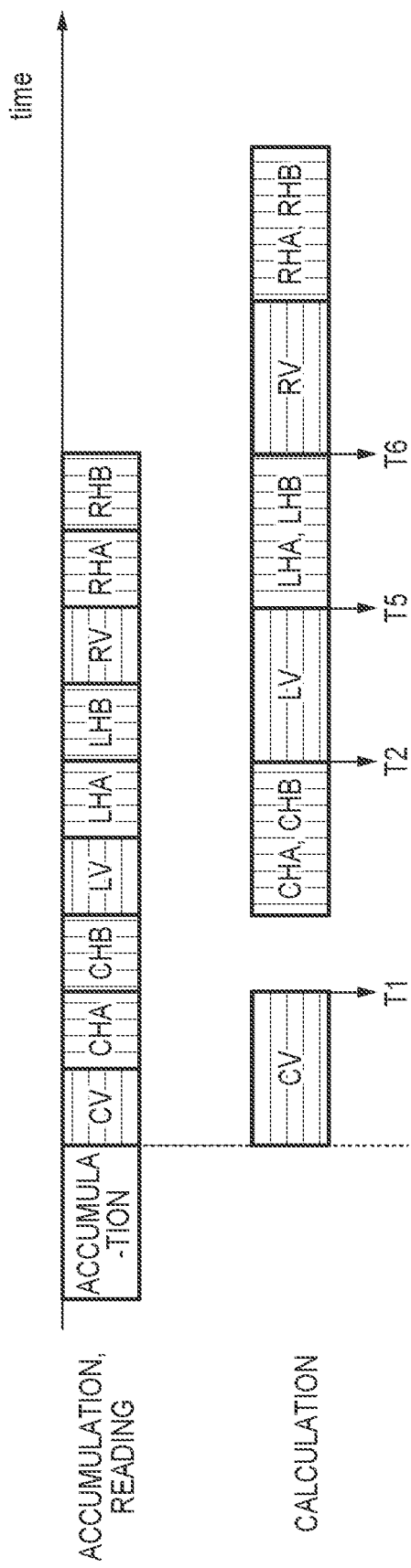
FIG. 14 is a timing chart of a reading order according to the first embodiment.

From the second AF processing onwards, the reading order is switched according to the main area used in the previous AF processing. If the area CV for horizontal line detection was used as the main area in the previous AF processing, signals are read in the order from the areas CV, CHA, and CHB as shown in FIG. 14. Accordingly, both of the results of the horizontal line detection and the vertical line detection can be obtained at the time T2, making it possible to reduce the AF processing time.

Figure 15:
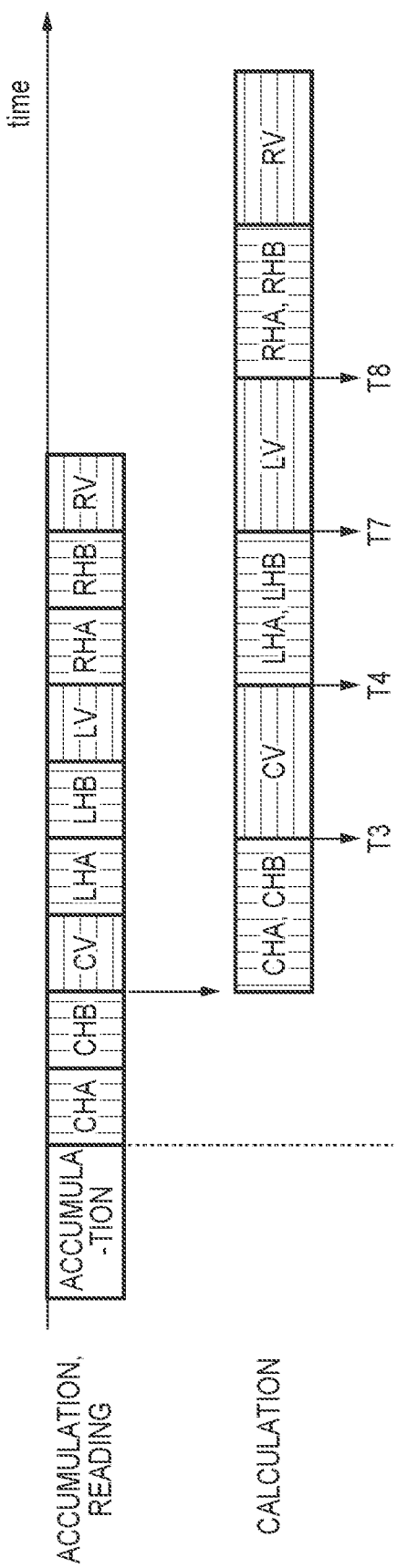
FIG. 15 is a timing chart of a reading order according to the first embodiment.

On the other hand, if the areas CHA and CHB for vertical line detection were used as the main areas in the previous AF processing, signals are read in the order from the areas CHA, CHB, and CV as shown in FIG. 15. Accordingly, the result of vertical line detection can be obtained at the time T3, making it possible to reduce the AF processing time.

Note that it takes time until the result of horizontal line detection is obtained, as in the AF optional selection, but if a result of vertical line detection was used in the previous case, the likelihood that a result of vertical line detection is used also in this case is high, and thus a priority is given to the vertical line detection. Also, if the main area is located to the right of the center in the previous AF processing, then the areas RHA, RHB, and RV are read first. If the main area is located to the left of the center, then the areas LHA, LHB, and LV are read first.

The reason is that, even if the main area is within the area CV in the previous AF processing and the main subject is located between the AF region 601 and the AF region 611, or between the AF region 601 and the AF region 621, detections results of the two regions are to be promptly calculated.

Second Embodiment

Hereinafter, a second embodiment of the present invention will be described. A digital camera of the present embodiment has the same external-appearance configuration as that of the digital camera 100 of the first embodiment, but differs therefrom in that focus detection is performed by the image sensor 104.

Figure 16:
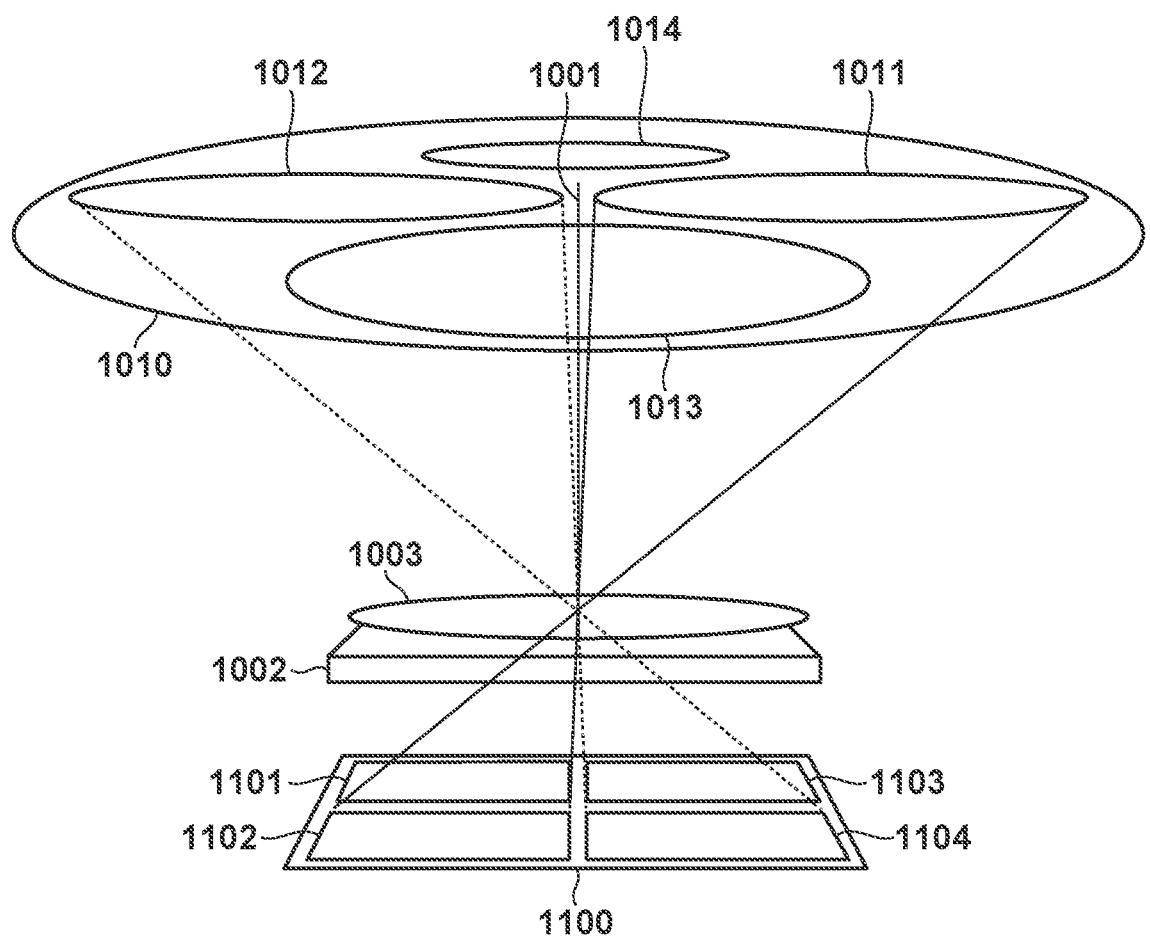
FIG. 16 is a perspective view schematically illustrating a configuration of a focus detection optical system according to a second embodiment.

FIG. 16 is a conceptual diagram showing a state in which a light flux that exits from an exit pupil of a lens enters a unit pixel of the image sensor 104.

In FIG. 16, a unit pixel 1100 includes 2×2 photodiodes 1101, 1102, 1103, and 1104. A color filter 1002 and a micro-lens 1003 are arranged in front of the unit pixel 1100. The lens 150 includes an exit pupil 1010. Letting the center of a light flux that exits from the exit pupil 1010 toward the unit pixel 1100 having the micro-lens 1003 be an optical axis 1001, light that has passed through the exit pupil 1010 enters the unit pixel 1100 with the optical axis 1001 serving as the center.

Due to the 2×2 photodiodes 1101, 1102, 1103, and 1104, the exit pupil 1010 of the lens 150 is divided. Specifically, as shown in FIG. 16, a light flux that passes through a pupil area 1011 is received by the photodiodes 1101 and 1102 via the micro-lens 1003. Also, a light flux that passes through a pupil area 1012 is received by the photodiodes 1103 and 1104 via the micro-lens 1003. That is, the photodiodes 1101 and 1102, and the photodiodes 1103 and 1104 respectively receive light of different pupil areas of the exit pupil 1010 of the lens 150. Accordingly, focus detection is possible by comparing an image signal obtained by adding up the signals of the photodiodes 1101 and 1102 with an image signal obtained by adding up the signals of the photodiodes 1103 and 1104.

Here, the image signal obtained by adding up the signals of the photodiodes 1101 and 1102 is defined as an A image signal, and the image signal obtained by adding up the signals of the photodiodes 1103 and 1104 is defined as a B image signal.

Similarly, a light flux that passes through a pupil area 1013 is received by the photodiodes 1101 and 1103 via the micro-lens 1003, and a light flux that passes through a pupil area 1014 is received by the photodiodes 1102 and 1104 via the micro-lens 1003. Accordingly, focus detection is possible by comparing an image signal obtained by adding up the signals of the photodiodes 1101 and 1103 with an image signal obtained by adding up the signals of the photodiodes 1102 and 1104.

Here, the image signal obtained by adding up the signals of the photodiodes 1101 and 1103 is defined as an A image signal, and the image signal obtained by adding up the signals of the photodiodes 1102 and 1104 is defined as a B image signal.

Figure 17:
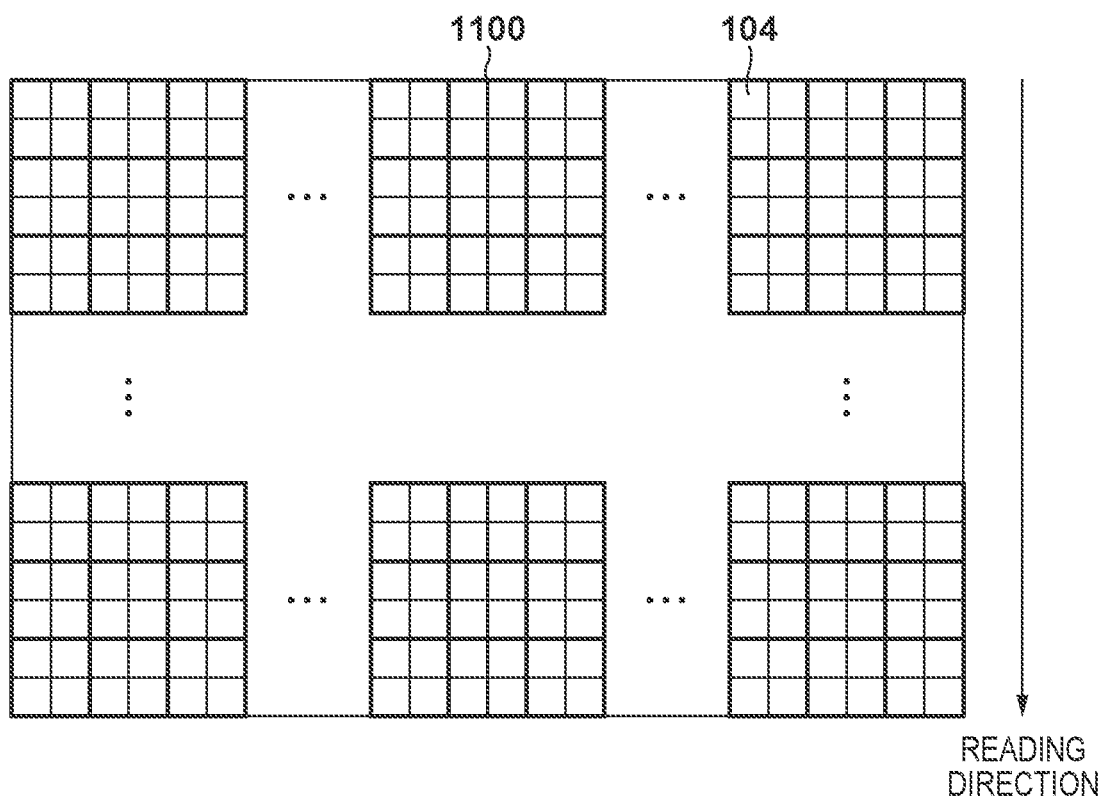
FIG. 17 is a diagram illustrating a configuration of an image sensor according to the second embodiment.

FIG. 17 is a diagram showing all of the pixels of the image sensor 104. The unit pixel 1100 described with reference to FIG. 16 includes 2×2 photodiodes.

Figure 18:
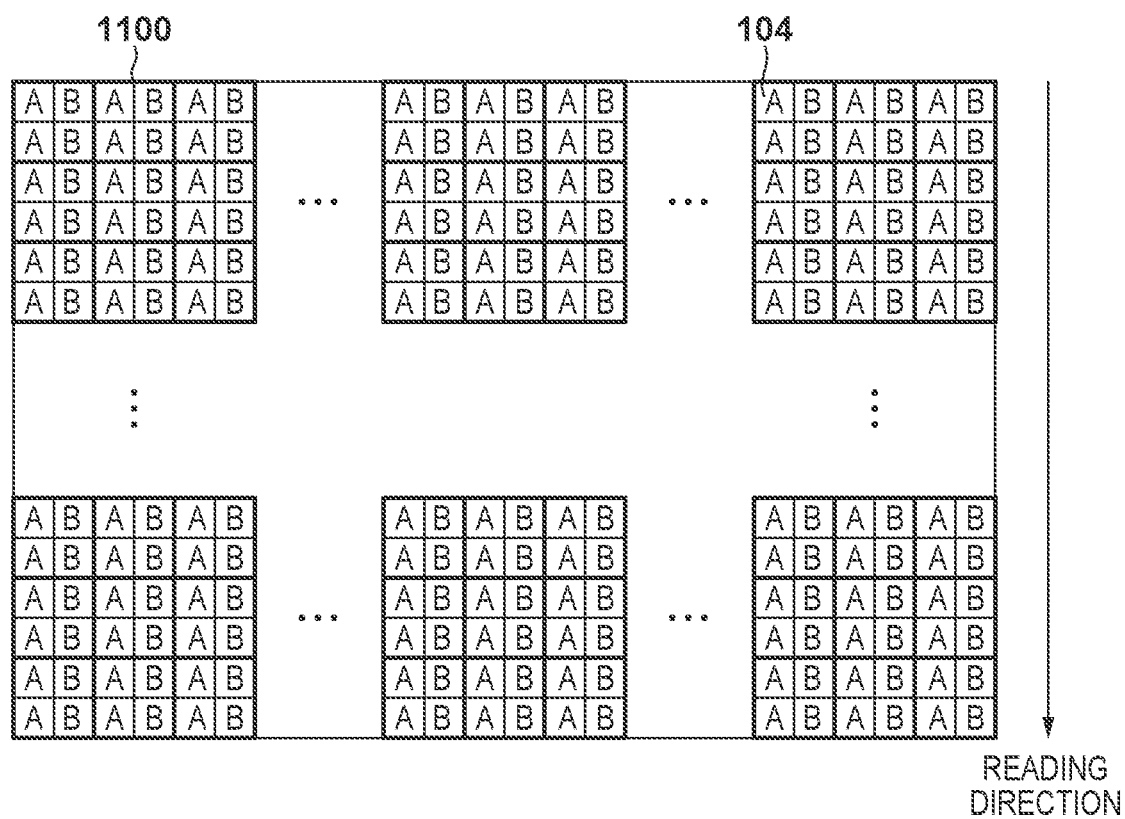
FIG. 18 is a diagram illustrating a method for generating A image signals and B image signals when the image sensor performs vertical line detection according to the second embodiment.
Figure 19:
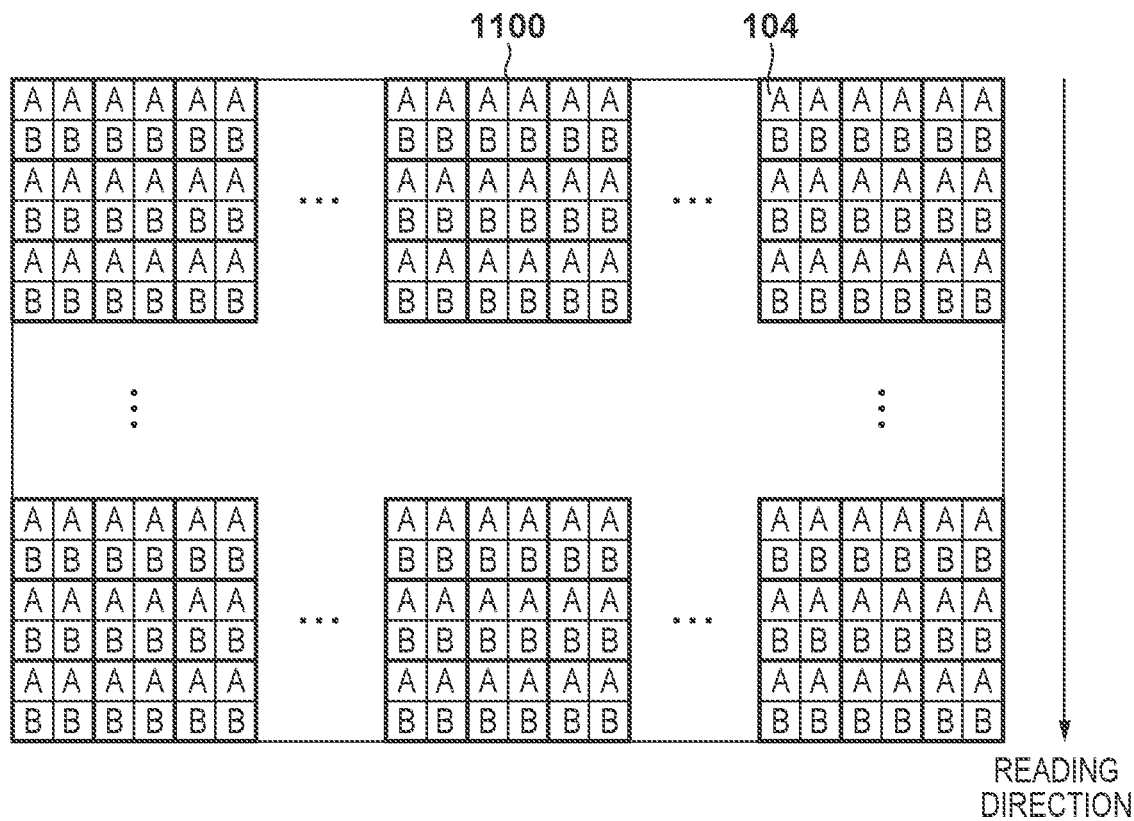
FIG. 19 is a diagram illustrating a method for generating A image signals and B image signals when the image sensor performs horizontal line detection according to the second embodiment.

When the image sensor 104 is used to detect lines in the vertical direction, the signals of the photodiodes within the unit pixel 1100 are added up in the vertical direction as shown in FIG. 18, so that A image signals and B image signals are generated. Similarly, when lines in the horizontal direction are detected, the signals of the photodiodes within the unit pixel 1100 are added up in the horizontal direction as shown in FIG. 19.

In contrast to the case of the focus detection sensor 117 in FIG. 5, the image sensor 104 in FIG. 17 reads signals for each of the rows horizontally arranged in the drawing. The horizontal direction (long-side direction of the image sensor 104) is referred to as "reading-target row direction" in the present embodiment. Signals of pixels of each row are transferred in a vertical direction by a signal line, and are input to a not-shown column AD converter. The vertical direction (short-side direction of the image sensor 104) is referred to as "reading direction" in the present embodiment. In such a configuration, when a vertical line is detected, the correlation direction is the horizontal direction and matches the reading-target row direction, and thus it is possible to start the focus detection processing at the same time as the reading of the signals. In contrast, when a horizontal line is detected, the correlation direction is the vertical direction and does not match the reading-target row direction, and thus it is not possible to start the focus detection processing at the same time as the reading of the signals.

Figure 20:
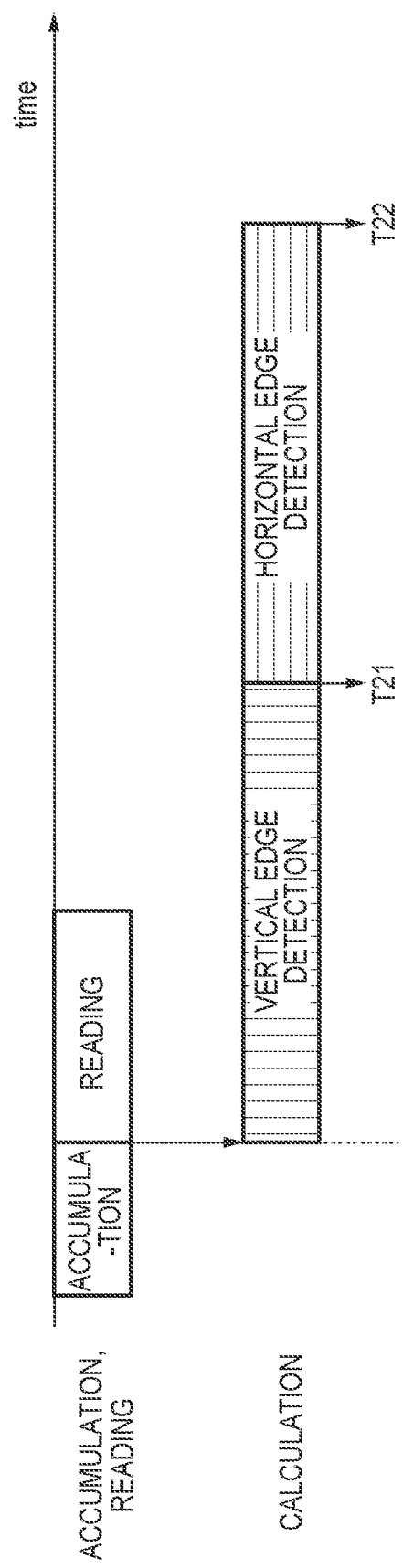
FIG. 20 is a timing chart of an image reading order according to the second embodiment.

Accordingly, in the first AF processing in which the situation of the subject field is unclear, or in a case where detection of a vertical line was possible in the previous AF processing, the signals of the photodiodes of pixels are added up by an adding method for vertical line detection as shown in FIG. 18. Also, as shown in FIG. 20, vertical line detection processing is performed at the same time as the reading of the signals. Also, horizontal line detection processing is performed after the signals of all of the rows have been read.

Figure 21:
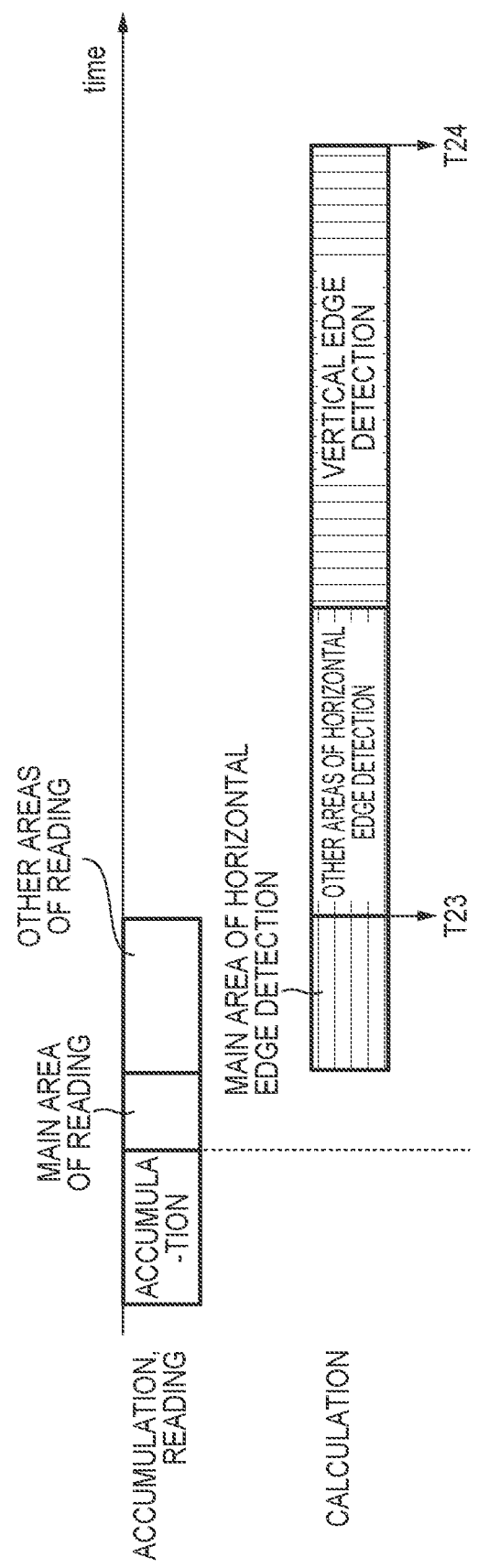
FIG. 21 is a timing chart of an image reading order according to the second embodiment.

If, in the previous AF processing, a result of horizontal line detection was used, as shown in FIG. 21, only the column of an area in which the main subject is present is first read. That is, by restricting the number of reading-target columns, time for reading each row is reduced. By reducing time for reading the signals of the area in which the subject is present, a result of the horizontal line detection is promptly calculated. After the signals of the above-described area have been read, signals of another area are read and calculation thereof is performed. Alternatively, a configuration is also possible in which the image sensor 104 is provided with scanning circuits respectively for the horizontal direction and the vertical direction, and the reading direction is switched according to the correlation direction.

Figure 22:
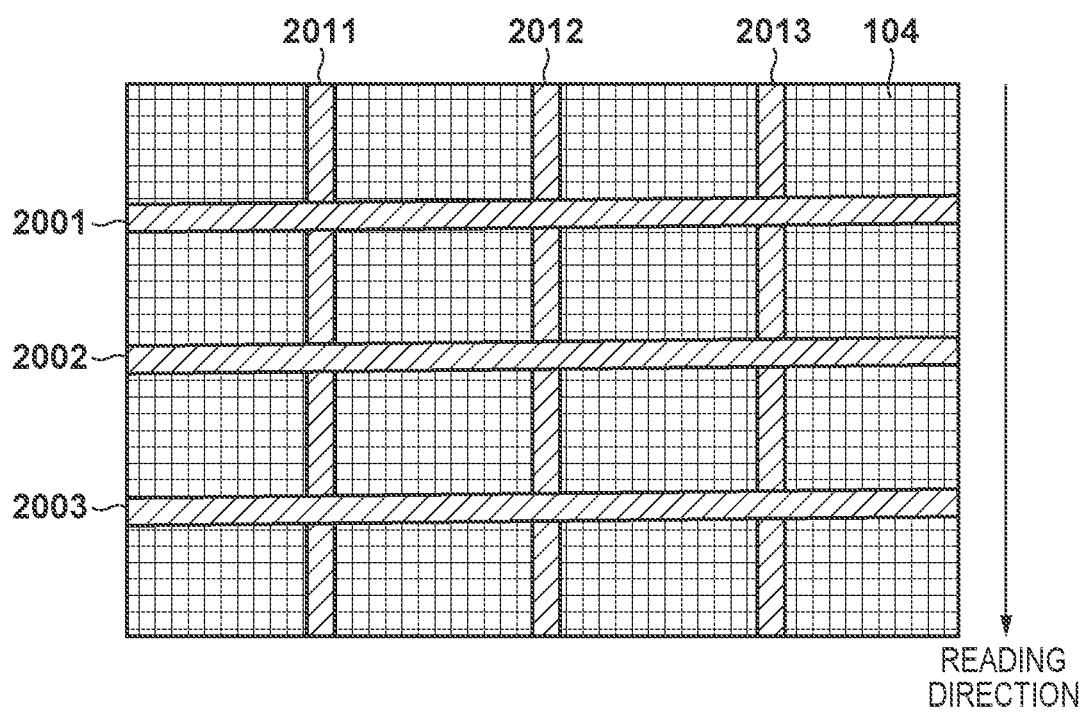
FIG. 22 is a diagram illustrating a modification of the configuration of the image sensor according to the second embodiment.

The above-described embodiment has described a configuration of the image sensor that includes a pixel portion in which a plurality of unit pixels, each having one micro-lens and a plurality of photoelectric conversion units, are aligned in a matrix. However, the present invention is also applicable to a case that uses an image sensor having a configuration in which, as shown in FIG. 22, the image sensor 104 includes a partial area including focus detection pixels 2001, 2002, and 2003 in which the reading direction and the correlation direction match each other, and another partial area including focus detection pixels 2011, 2012, and 2013 in which the reading direction and the correlation direction do not match each other.

Third Embodiment

In the first embodiment, exposure of an image for phase difference detection is performed by the focus detection sensor 117. As an exposure amount determination method in this case, for example, Japanese Patent Laid-Open No. 10-104502 uses a method in which an area sensor is divided into a plurality of regions, the maximum charge amount within each divided region is monitored, and accumulation is completed independently for each divided region. Also, Japanese Patent No. 5478751 uses a method in which monitor units are arranged in four corner regions, and the exposure amount is determined using outputs of the monitors. However, these methods require a circuit for monitoring the charge amount, resulting in an increase in the circuit size.

Alternatively, there is also a method in which accumulation is performed using a fixed exposure amount at the first exposure, and if, as a result, the signal level is low, the exposure amount is increased and accumulation is performed again, and if the signal level is high, the exposure amount is decreased and accumulation is performed again, but in this case, it takes time until the exposure amounts converge to an appropriate exposure amount.

This third embodiment will describe a configuration for reducing the processing time of exposure amount determination processing while suppressing the circuit size of an area sensor for use in focus detection.

Hereinafter, the third embodiment of the present invention is described. A digital camera according to the present embodiment has the same external-appearance configuration as that of the digital camera 100 of the first embodiment, and thus a description thereof is omitted.

Figure 23:
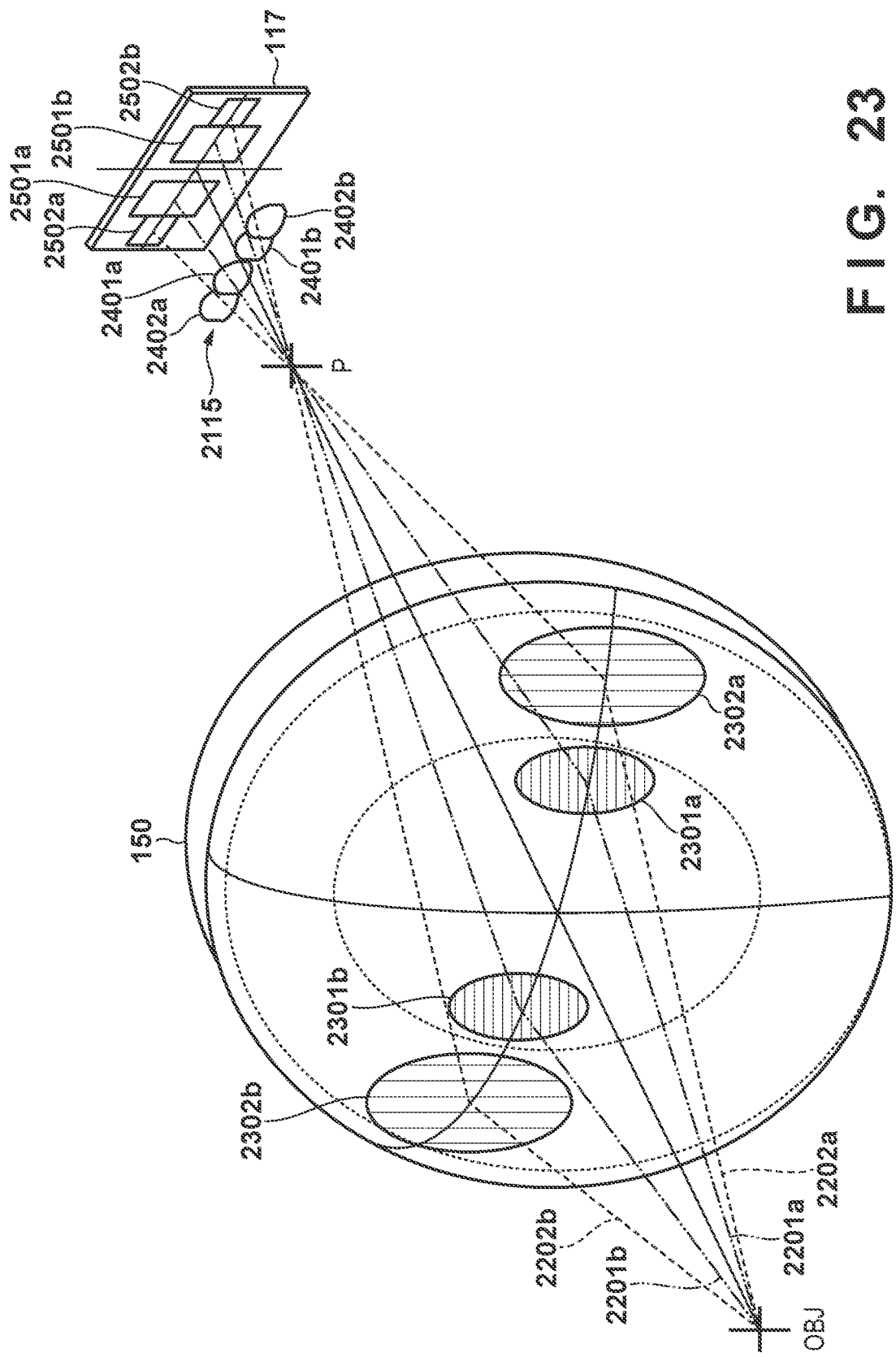
FIG. 23 is a perspective view schematically illustrating a configuration of a focus detection optical system according to a third embodiment.

FIG. 23 is a perspective view conceptually illustrating light fluxes that correspond to a focus detection system according to the present embodiment. Light fluxes 2201a and 2201b from a subject OBJ pass through relatively small pupil areas 2301a and 2301b on the aperture diameter of the lens 150, and form an image on a focusing plane P (primary imaging plane) in the vicinity of the field mask 112. The light fluxes 2201a and 2201b are divided at secondary imaging lenses 2401a and 2401b to reform images in image formation areas 2501a and 2501b of the focus detection sensor 117, and the two left and right subject images are subjected to correlation calculation, thereby obtaining the defocus amount.

Similarly, light fluxes 2202a and 2202b pass through relatively large pupil areas 2302a and 2302b on the aperture diameter of the lens 150, and an image is formed on the focusing plane P (primary imaging plane) in the vicinity of the field mask 112. The light fluxes 2202a and 2202b are divided at secondary imaging lenses 2402a and 2402b to reform images in image formation areas 2502a and 2502b of the focus detection sensor 117, and the two left and right subject images are subjected to correlation calculation, thereby obtaining the defocus amount.

The image formation areas 2502a and 2502b correspond to the light fluxes 2202a and 2202b whose base lengths are relatively long and that have high focus detection accuracy. Also, because the pupils are large, the amounts of arriving light are also large. The image formation areas 2501a and 2501b correspond to the light fluxes 2201a and 2201b that have relatively large range in which a defocus amount can be detected. The focus detection sensor 117 reads signals for each vertical column as in the first embodiment, and the scanning direction of reading-target columns is defined as the horizontal direction (long-side direction) as in the first embodiment. Control parameters of the focus detection sensor 117 include accumulation time and information on the reading order.

Figure 24:
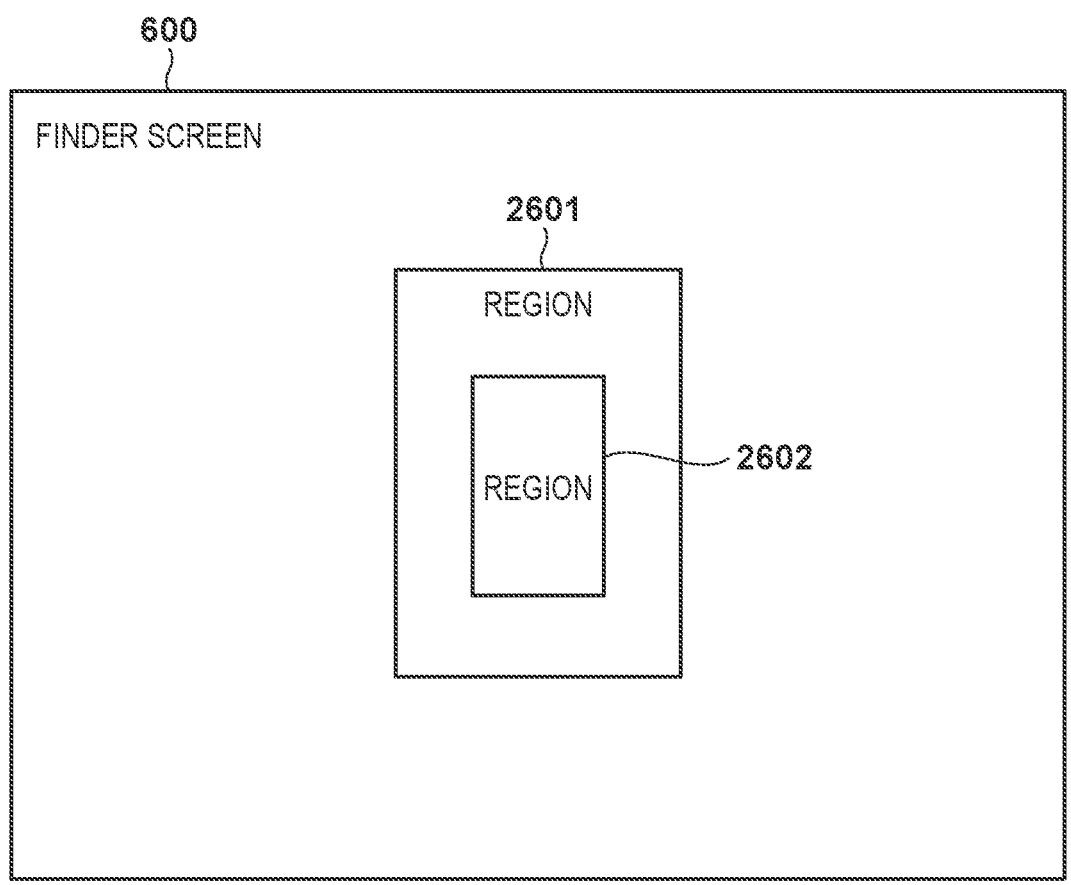
FIG. 24 is a diagram illustrating an image formation area on a finder screen according to the third embodiment.

FIG. 24 is a diagram showing the relationship between AF regions on the finder screen 600. An AF region 2601 and an AF region 2602 are arranged on the finder screen 600. The AF region 2601 is an AF region constituted by the image formation areas 2501a and 2501b, and the AF region 2602 is an AF region constituted by the image formation areas 2502a and 2502b. In the present embodiment, the AF region 2601 has a lager field of view than the AF region 2602.

Hereinafter, an operation of the digital camera 100 of the present embodiment will be described, but the procedure of image capturing control processing executed by the digital camera 100 is the same as that shown in FIG. 7 of the first embodiment, and thus a description thereof is omitted.

Figure 25:
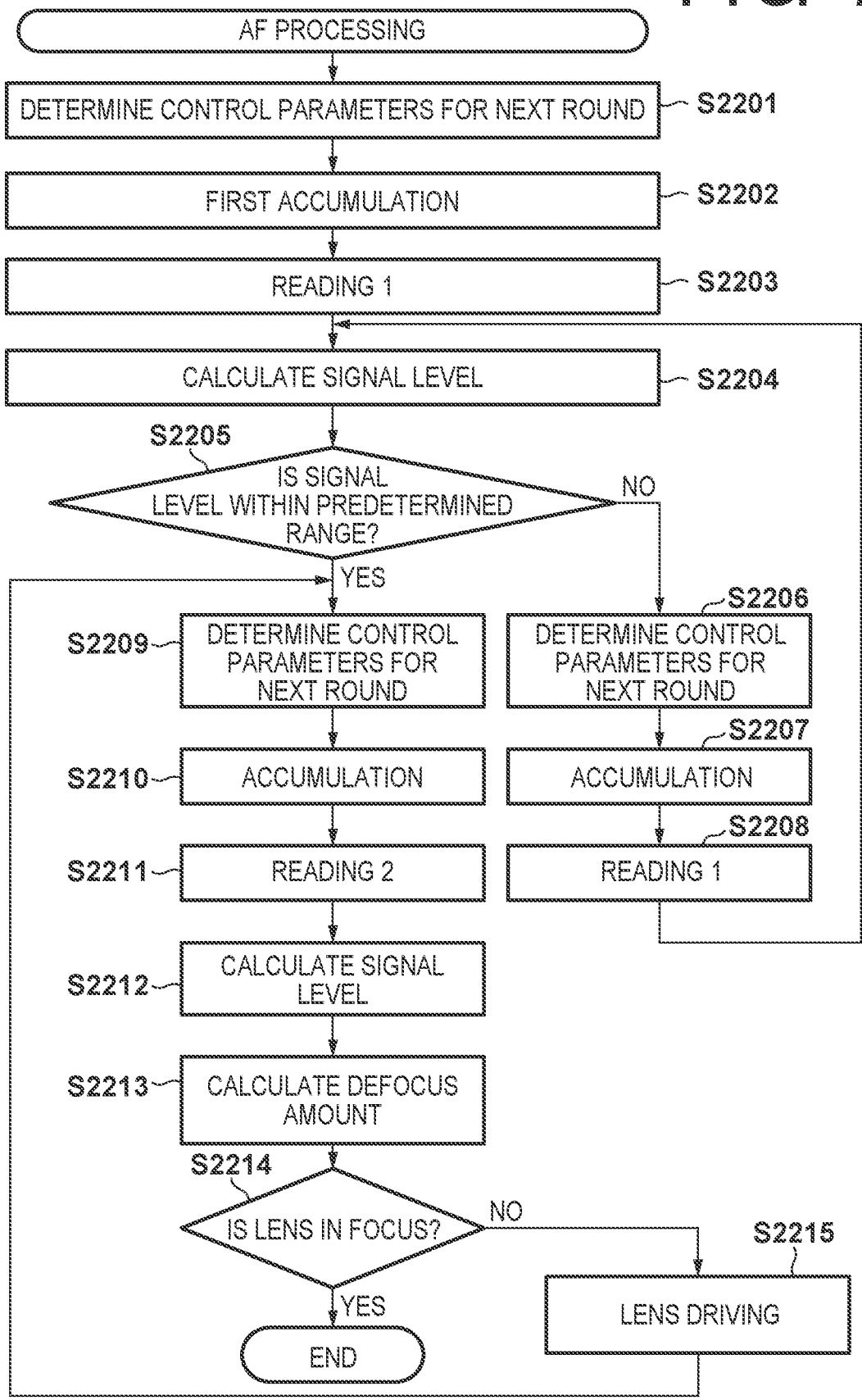
FIG. 25 is a flowchart illustrating an accumulating operation of the focus detection sensor according to the third embodiment.

FIG. 25 is a flowchart illustrating a procedure of the AF processing in step S102 in FIG. 7.

In step S2201, the CPU 102 determines the accumulation time and the reading order of the image formation areas, which are control parameters for the next round.

As the accumulation time, an accumulation time T(1) is set in which an output that corresponds to the luminance at the center of an AF luminance range required for the digital camera 100 is equal to the central value of a dynamic range of the focus detection sensor 117. For example, in the present embodiment, if the required AF luminance range is from about −5 to +15 in terms of By value, the accumulation time of the focus detection sensor 117 is set such that the output that corresponds to the luminance of Bv 5 is equal to the central value of the dynamic range of the image formation areas 2502a and 2502b of the focus detection sensor 117. The reading order is such that the image formation areas 2502a and 2502b that have a large amount of arriving light are first read, and then the image formation areas 2501a and 2501b are read.

In step S2202, the CPU 102 executes the first accumulation for the accumulation time determined in step S2201. In step S2203, the CPU 102 reads signals of the image formation areas in accordance with the reading order determined in step S2201.

In step S2204, the CPU 102 calculates a signal level Y of the image formation area read in step S2203. The signal level Y is the maximum value within the image formation area. Then, a difference $\Delta Y$ between the signal level Y and a target signal amount Ytarget is calculated.

$$\Delta Y = Ytarget \div Y$$

Note that in the present embodiment, the signal level Y is the maximum value within the image formation area, but may be calculated based on an average of the values within the image formation area, or a weighted average obtained by dividing the image formation area, and performing multiplication by different coefficients for the respective divided areas.

In step S2205, the CPU 102 determines whether or not the signal level Y calculated in step S2204 is within the desired range, and if the signal level Y is within the desired range, the procedure moves to step S2209, whereas if the signal level Y is not within the desired range, the procedure moves to step S2206. For example, it is assumed that, in the determination of step S2205, it is determined whether or not the difference $\Delta Y$ is within a range from −2 stage to +3 stage (0.25≤$\Delta Y$≤8.0).

In step S2206, the CPU 102 determines the accumulation time and the reading order of the image formation areas, which are control parameters for the next round. The accumulation time is determined based on the formula below.

$$T(2) = T(1) \times \Delta Y$$

Where T2 denotes the accumulation time for the second round, and T(1) denotes the first accumulation time. The reading order is such that the image formation areas 2502a and 2502b that have a large amount of arriving light are first read, and then the image formation areas 2501a and 2501b are read.

In step S2207, the CPU 102 executes second accumulation using the control parameter T(2) determined in step S2206. In step S2208, the CPU 102 reads signals of the image formation areas in accordance with the reading order determined in step S2206.

After the processing in step S2208, the processing in step S2204 is performed again. The steps S2204 to S2208 are repeated until the difference $\Delta Y$ between the signal level Y and the target signal amount Ytarget falls within the desired range in step S2205.

As described above, if the luminance of a subject field is unclear, signals of the image formation areas 2502a and 2502b that have a larger amount of arriving light are preferentially used, thereby achieving a reduction in the processing time until the accumulation time is determined.

In the processing after the luminance of the subject field has been determined, signals of the image formation areas 2501a and 2501b that have a larger field of view are preferentially used.

In step S2209, the CPU 102 determines the accumulation time and the reading order of image formation areas, which are control parameters for the next round. The accumulation time is determined using the formula below.

$$T(n)=T(n-1)\times\Delta Y(n-1)\times\Delta L$$

Where T(n) denotes the accumulation time for the second round, T(n−1) denotes the previous accumulation time, and ΔL is a correction amount taking into consideration the difference in the amount of arriving light between the image formation areas.

The difference in the amount of arriving light between the image formation areas is known in advance. For example, it is assumed that the amount of light arriving at the image formation areas 2502a and 2502b is larger than that of the image formation areas 2501a and 2501b by one stage. If the previous signal level Y is calculated using the image formation areas 2502a and 2502b, multiplication by ΔL=2.0 (1.0 stage) is made in order to ensure a sufficient amount of signals even in the image formation areas 2501a and 2501b. The reading order of the image formation areas is such that in the processing after the luminance of the subject field has been determined, signals of the image formation areas 2501a and 2501b that have a larger field of view are first read, and then signals of the image formation areas 2502a and 2502b are read.

In step S2210, the CPU 102 executes accumulation for the accumulation time determined in step S2209. In step S2211, the CPU 102 reads signals of the image formation areas in accordance with the reading order determined in step S2209.

In step S2212, the CPU 102 calculates the signal level Y of the image formation areas read in step S2211. The basic calculation is the same as that in step S2204, although the image formation areas to be processed are different.

In step S2213, the CPU 102 calculates the defocus amount from the pixel signals of the image formation areas obtained in step S2211. Image signals are obtained from pixel outputs of the same row of a pair of image formation areas. Then, the focus state (defocus amount) of the lens 150 is detected based on the phase difference between the image signals. An eventual result is obtained by subjecting the calculation results of the defocus amounts to averaging, weighted averaging, or the like. Any of the defocus amounts is selected from the defocus amounts of a plurality of rows of the image formation areas. The selection method is not particularly limited, but it is possible to select a reliable defocus amount, such as a defocus amount for which the correlation of the waveforms of image signals is high or the contrast of the waveforms of image signals is high.

In step S2214, the CPU 102 determines that the lens is in focus if the defocus amount calculated in step S2213 is within a desired range, for example, within ¼ Fδ (where F is a diaphragm value of the lens, and δ is a constant (20 μm)). For example, if the lens diaphragm value F=2.0, and the defocus amount is 10 μm or smaller, it is determined that the lens is in focus, and the AF processing is ended.

On the other hand, if all of the defocus amounts are larger than ¼ Fδ, the procedure moves to step S2215, where the CPU 102 instructs the lens 150 to perform lens driving by the amount that corresponds to one of the defocus amounts of each focus detection region obtained in step S2213. Then, the CPU 102 moves the processing back to step S2209, and repeats the operations from steps S2209 to S2215 until it is determined that the lens is in the focus state.

As described above, the present embodiment has described an example in which, if the luminance of a subject field is unclear, signals of the image formation areas 2502a and 2502b that have a larger amount of light are preferentially used, and after the luminance of the subject field has become clear, signals of the image formation areas 2501a and 2501b that have a larger field of view are preferentially used. However, the present invention is not limited to this, and a configuration is also possible in which it is switched whether the image formation areas 2501a and 2501b or the image formation areas 2502a and 2502b are preferentially used based on the camera settings or the previous AF result.

For example, if the AF mode of the camera main body 101 is set to automatic selection, a large field of view is required, and thus the image formation areas 2501a and 2501b are preferentially processed. Also, if the AF mode is set to focus detection at a single point in the center, a large field of view is not required, and thus the image formation areas 2502a and 2502b are preferentially processed. Also, if the luminance of the subject field is low, the image formation areas 2502a and 2502b that have a large amount of arriving light may be preferentially processed.

Fourth Embodiment

Similar to the third embodiment, this fourth embodiment also relates to a configuration for reducing the processing time of exposure amount determination processing while suppressing the circuit size of an area sensor for use in focus detection.

A digital camera according to the fourth embodiment also has the same appearance configuration as that of the digital camera 100 of the first embodiment, and thus a description thereof is omitted. Also, the configurations shown in FIGS. 23 and 24 are the same as those of the third embodiment, and thus descriptions thereof are omitted. Also, the overall procedure of image capturing control processing executed by the digital camera 100 is the same as that shown in FIG. 7 of the first embodiment.

Figure 26:
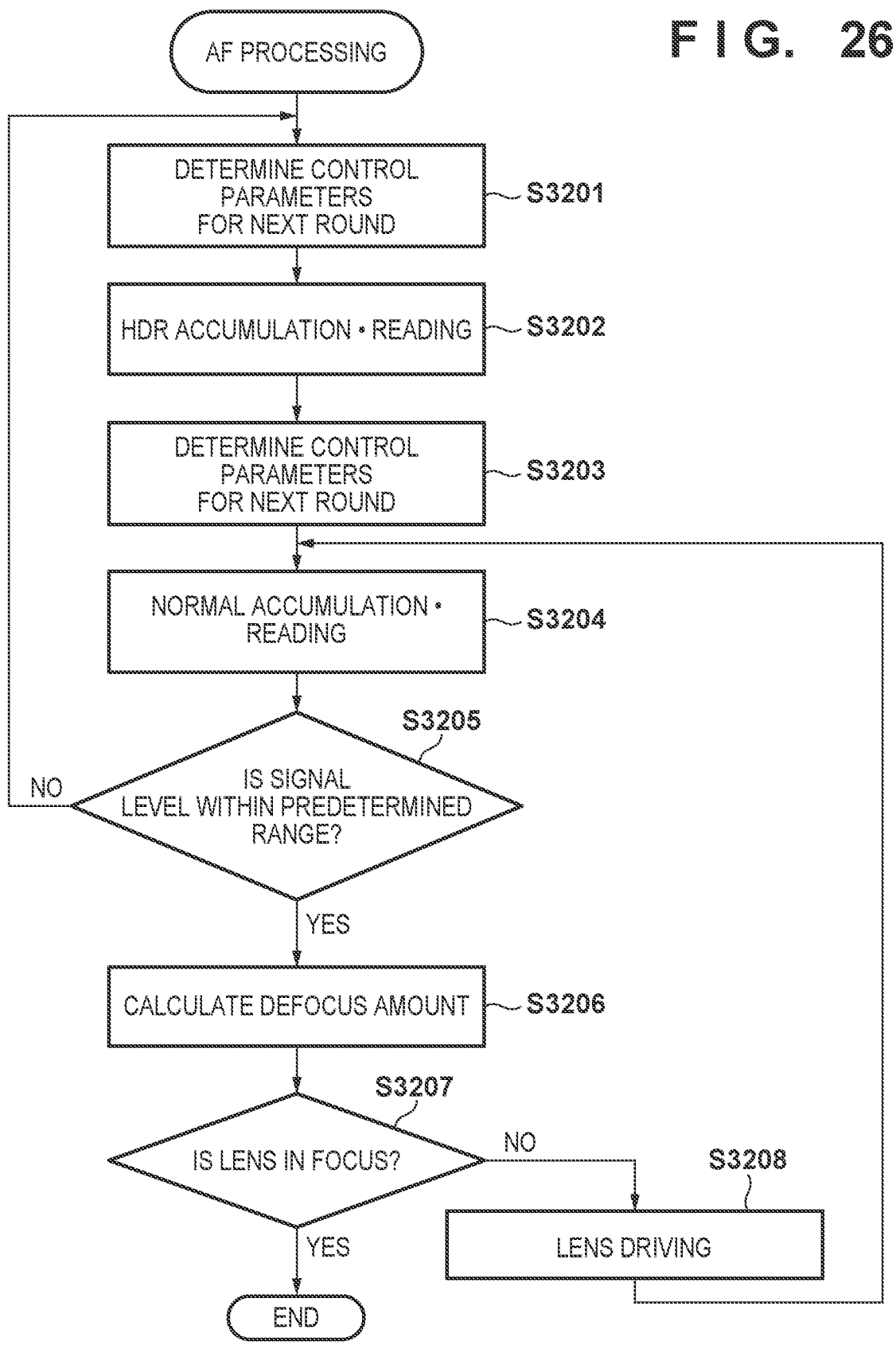
FIG. 26 is a flowchart illustrating an accumulating operation of a focus detection sensor according to a fourth embodiment.

FIG. 26 is a flowchart illustrating a procedure of the AF processing of step S102 in FIG. 7.

In step S3201, the CPU 102 determines the accumulation time for a high dynamic range (hereinafter, abbreviated as "HDR"), which is a control parameter for the next round. Here, the HDR is described in detail with reference to FIG. 27. At the first time, because the luminance of a subject field is unclear, an appropriate exposure amount needs to be determined.

In the configuration of the present embodiment, as shown in FIG. 23, the same field of view is imaged on the four different image formation areas 2501a, 2501b, 2502a, and 2502b of the focus detection sensor 117. If different exposure amounts can be set for the respective image formation areas, it is possible to achieve the luminance of the subject field with a high dynamic range (HDR).

Figure 27:
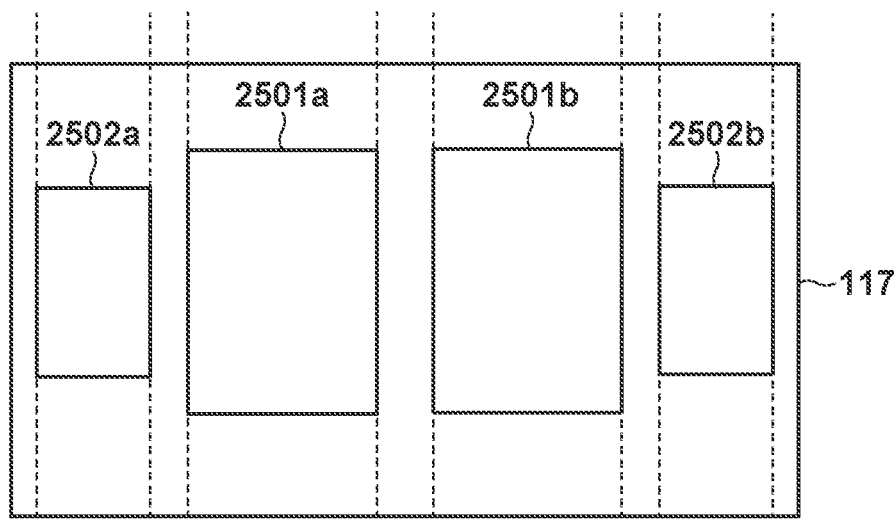
FIG. 27 is a diagram illustrating a layout of the focus detection sensor according to the fourth embodiment.

In FIG. 27, similar to the first embodiment, in the focus detection sensor 117, signals are read for each vertical column (short-side direction), and the scanning direction of the reading-target columns is defined as the horizontal direction (long-side direction) as in the first embodiment. Also, the focus detection sensor 117 realizes the HDR by changing the timing at which charge accumulation is started for each column, or changing the gain for each column, and thereby setting an independent exposure amount for each column.

In step S3201, for example, the exposure amount (accumulation time and the gain) for which the luminance range of the By values 10 to 15 can be measured is set for the image formation area 2501a. Similarly, settings are made such that the image formation area 2501b corresponds to the luminance range of the By values 5 to 10, the image formation area 2502a corresponds to the luminance range of the By values 0 to 5, and the image formation area 2502b corresponds to the luminance range of the By values −5 to 0. By performing the exposure of the HDR in this way, information on a large luminance range can be obtained by one exposure, and thus it is possible to obtain, based on the information obtained through one exposure, an appropriate exposure amount for the normal accumulation from the second accumulation onwards.

In step S3202, the CPU 102 executes HDR accumulation for the accumulation time determined in step S3201 and reading. In step S3203, the CPU 102 determines the accumulation time T(2) when normal accumulation is performed. The signal levels Y1 to Y4 are calculated for each of the image formation areas having different exposure amounts. The above-described signal levels Y1 to Y4 are the maximum value within each of the image formation areas.

Then, from among the signal levels Y1 to Y4, the signal level that is closest to the target signal amount Ytarget is defined as the signal level Y. Also, the exposure time in which the signal level Y is obtained is defined as T(1). Then, a difference $\Delta Y$ between the signal level Y and the target signal amount Ytarget is calculated.

$$\Delta Y = Ytarget \div Y$$

Then, the exposure time thereafter is determined using the formula below.

$$T(2) = T(1) \times \Delta Y$$

Where, T(2) denotes the exposure time from the second round onwards, and T(1) denotes the first exposure time.

Note that in the present embodiment, the signal level Y is the maximum value of each image formation area, but may be calculated as an average of the values within the image formation area, or a weighted average obtained by dividing the image formation area, and performing multiplication by different coefficients for the respective divided areas.

In step S3204, the CPU 102 executes normal accumulation for the accumulation time determined in step S3203 and reading. In step S3205, the CPU 102 calculates the signal level Y of the image formation area read in step S3204. The above-described signal level Y is the maximum value within the image formation area. Then, a difference $\Delta Y$ between the signal level Y and the target signal amount Ytarget is calculated.

$$\Delta Y = Ytarget \div Y$$

Then, it is determined whether or not the calculated difference $\Delta Y$ is within a desired range, and if the calculated difference $\Delta Y$ is within a predetermined range, the procedure moves to step S3206, whereas if the calculated difference $\Delta Y$ is not within the predetermined range, the procedure moves to step S3201. For example, in the determination in step S3205, it is determined whether or not the difference $\Delta Y$ is within a range from −2 stage to +3 stage ($0.25 \leq \Delta Y \leq 8.0$). Here, if the difference $\Delta Y$ is not within the desired range, it is a high likelihood that the luminance of the subject field has largely changed. Accordingly, the procedure from the measurement of the luminance of the subject field is performed again.

In step S3206, the CPU 102 calculates the defocus amount from pixel signals for each of the image formation areas obtained in step S3204. Image signals are obtained from pixel outputs of the same row of a pair of image formation areas. Then, the focus state (defocus amount) of the image capturing lens is detected based on the phase difference between the image signals. An eventual result is obtained by subjecting the calculation results of the defocus amounts to averaging, weighted averaging, or the like. Any of the defocus amounts is selected from the defocus amounts of a plurality of rows of the image formation area. The selection method is not particularly limited, but it is possible to select a reliable defocus amount, such as a defocus amount for which the correlation of the waveforms of image signals is high or the contrast of the waveforms of image signals is high.

In step S3207, the CPU 102 determines that the lens is in focus if the defocus amount calculated in step S3206 is within a desired range, for example, within ¼ F$\delta$ (where F is a diaphragm value of the lens, and $\delta$ is a constant (20 µm)). For example, if the lens diaphragm value F=2.0, and the defocus amount is 10 µm or smaller, it is determined that the lens is in focus, and the AF processing is ended.

On the other hand, if all of the defocus amounts are larger than ¼ F$\delta$, in step S3208, the CPU 102 instructs the lens 150 to perform lens driving by the amount that corresponds to one of the defocus amounts of each focus detection region obtained in step S3206. Then, the CPU 102 moves the processing back to step S3204, and repeats the operations of steps S3204 to S3208 until it is determined that the lens is in the focus state.

Note that if the image formation areas have different amounts of arriving light, it is sufficient to determine the exposure amount taking the fact into consideration. For example, by using the image formation areas 2502a and 2502b that have a large amount of arriving light for measurement of low luminance, and using the image formation areas 2501a and 2501b that have a small amount of arriving light for measurement of high luminance, it is possible to reduce the accumulation time.

As described above, by changing the exposure amount for each of a plurality of image formation areas that have the same field of view, it is possible to reduce the processing time of the exposure amount determination processing.

The preferred embodiments of the present invention have been described, but the invention is not limited to the foregoing embodiments, and various alterations and modifications are possible within the spirit of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to provide an image capturing apparatus that can reduce the processing time of focus detection.

Other features and advantages of the present invention will be apparent from the following description taken in conjunction with the accompanying drawings. Note that the same reference numerals denote the same or like components throughout the accompanying drawings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus comprising:
   an area sensor on which photoelectric conversion elements are arranged two-dimensionally, and that includes a plurality of regions; and
   at least one processor or circuit configured to function as a plurality of units comprising:
   (1) a reading unit configured to read, from the area sensor, signals photoelectrically converted by the photoelectric conversion elements;
   (2) a focus detection unit configured to perform focus detection using the signals read by the reading unit; and
   (3) a control unit configured to (a) determine a priority for reading out signals of each region of the plurality of regions, each of which is able to output signals for the focus detection, and (b) control the reading unit to change an order of reading out signals of the plurality of regions based on the priority,
   wherein the plurality of regions includes a first region in which a division direction of pupil areas of a lens and a reading-target column direction match each other and a second region in which a division direction of pupil areas of the lens and a reading-target column direction do not match each other, and
   wherein the control unit controls the reading unit to preferentially read out either signals of photoelectric conversion elements in the first region or signals of photoelectric conversion elements in the second region.

2. The image capturing apparatus according to claim 1, the first region is a region in which a first photoelectric conversion element that receives light from a first pupil area of pupil areas of a lens, and a second photoelectric conversion element that receives light from a second pupil area, which is different from the first pupil area, are aligned in a first direction; and the second region is a region in which a third photoelectric conversion element that receives light from a third pupil area of the pupil areas of the lens, and a fourth photoelectric conversion element that receives light from a fourth pupil area, which is different from the third pupil area, are aligned in a second direction, which is different from the first direction,
   wherein the area sensor is an area sensor capable of reading signals for each of reading-target columns aligned in the first direction, and
   wherein the control unit performs control as to from which one of the first region and the second region the signals of the photoelectric conversion elements are preferentially read.

3. The image capturing apparatus according to claim 2, wherein the control unit performs control such that in first focus detection processing, the reading unit preferentially reads the signals of the photoelectric conversion elements in the first region in which a division direction of the pupil areas of the lens and a direction of the reading-target columns match each other.

4. The image capturing apparatus according to claim 3, wherein the control unit performs control such that in the first focus detection processing, the reading unit preferentially reads the signals of the photoelectric conversion elements in the first region in which the division direction of the pupil areas of the lens and the direction of the reading-target columns match each other, and then reads the signals of the photoelectric conversion elements in the second region in which a division direction of the pupil areas of the lens and the direction of the reading-target columns do not match each other.

5. The image capturing apparatus according to claim 3, wherein the control unit performs control such that if, in the previous focus detection processing, focus detection was performed using the signals of the photoelectric conversion elements of the first region, in the next focus detection processing, the reading unit preferentially reads the signals of the photoelectric conversion elements in the first region.

6. The image capturing apparatus according to claim 3, wherein the control unit performs control such that if, in the previous focus detection processing, focus detection was performed using the signals of the photoelectric conversion elements of the second region, in the next focus detection processing, the reading unit preferentially reads the signals of the photoelectric conversion elements in the second region.

7. The image capturing apparatus according to claim 2, wherein the area sensor is an image sensor that is for imaging a subject, and on which pixels are aligned two-dimensionally, the pixels each including the first to fourth photoelectric conversion elements for one micro-lens.

8. The image capturing apparatus according to claim 7, wherein the image sensor can change a reading direction so that signals are read for each of reading-target columns aligned in the second direction.

9. The image capturing apparatus according to claim 1, wherein the control unit controls, in first focus detection processing, the reading unit to preferentially read the signals of the photoelectric conversion elements in a region that has a larger amount of arriving light, out of the plurality of regions of the area sensor.

10. The image capturing apparatus according to claim 1, wherein the control unit controls, when a subject field is dark, the reading unit to preferentially read the signals of the photoelectric conversion elements in a region that has a larger amount of arriving light, out of the plurality of regions of the area sensor.

11. The image capturing apparatus according to claim 9, wherein the control unit determines, based on the signals of the photoelectric conversion elements in a region that has a larger amount of arriving light, an exposure amount of the area sensor for use in the next focus detection processing.

12. The image capturing apparatus according to claim 11, wherein the control unit determines, further based on a difference in the amount of arriving light between the plurality of regions of the area sensor, an exposure amount of the area sensor for use in the next focus detection processing.

13. The image capturing apparatus according to claim 1, wherein the control unit changes an exposure amount for each of the plurality of regions of the area sensor to obtain a subject image.

14. The image capturing apparatus according to claim 13, wherein the control unit causes the photoelectric conversion elements of a region that has a larger amount of arriving light, out of the plurality of regions of the area sensor, to perform detection in a luminance range with a low luminance, and wherein the control unit causes the photoelectric conversion elements of a region, out of the plurality of regions of the area sensor, that has a smaller amount of arriving light to perform detection in a luminance range with a high luminance.

15. A method for controlling an image capturing apparatus including an area sensor on which photoelectric conversion elements are arranged two-dimensionally, and that includes a plurality of regions, the method comprising:

reading, from the area sensor, signals photoelectrically converted by the photoelectric conversion elements;

performing focus detection using the signals read in the reading;

determining a priority for reading out signals of each region of the plurality of regions, each of which is able to output signals for the focus detection; and controlling to change an order of reading out signals of the plurality of regions based on the priority, wherein the plurality of regions includes a first region in which a division direction of pupil areas of a lens and a reading-target column direction match each other and a second region in which a division direction of pupil areas of the lens and a reading-target column direction do not match each other, and wherein in the controlling, the reading is controlled to preferentially read out either signals of photoelectric conversion elements in the first region or signals of photoelectric conversion elements in the second region.

16. A non-transitory computer-readable storage medium that stores a program for causing a computer to execute a method for controlling an image capturing apparatus, the image capturing apparatus including an area sensor on which photoelectric conversion elements are arranged two-dimensionally, and that includes a plurality of regions, the method comprising:

reading, from the area sensor, signals photoelectrically converted by the photoelectric conversion elements;

performing focus detection using the signals read in the reading;

determining a priority for reading out signals of each region of the plurality of regions, each of which is able to output signals for the focus detection; and controlling to change an order of reading out signals of the plurality of regions based on the priority, wherein the plurality of regions includes a first region in which a division direction of pupil areas of a lens and a reading-target column direction match each other and a second region in which a division direction of pupil areas of the lens and a reading-target column direction do not match each other, and wherein in the controlling, the reading is controlled to preferentially read out either signals of photoelectric conversion elements in the first region or signals of photoelectric conversion elements in the second region.

* * * * *